United States Patent [19]

Stanciu et al.

[11] 4,274,823
[45] Jun. 23, 1981

[54] WAX INJECTION MOLDING APPARATUS AND CONTROL SYSTEM

[75] Inventors: Virgil V. Stanciu, Rocky River; Robert A. Cutler, Chardon; Kenneth R. Kasper, Parma, all of Ohio

[73] Assignee: Tempcraft Tool & Mold Inc., Cleveland, Ohio

[21] Appl. No.: 24,263

[22] Filed: Mar. 27, 1979

[51] Int. Cl.³ .............................................. B29F 1/06
[52] U.S. Cl. .............................. 425/145; 264/328.19; 425/149
[58] Field of Search ..................... 425/145, 149, 558; 264/328.19

[56] References Cited

U.S. PATENT DOCUMENTS

| | | | |
|---|---|---|---|
| 3,647,309 | 3/1972 | Thompson | 425/145 X |
| 3,698,640 | 10/1972 | Stronciu | 425/145 X |
| 3,752,363 | 8/1973 | Fegley | 425/145 X |
| 3,767,339 | 10/1973 | Hunkar | 425/149 X |
| 3,840,312 | 10/1974 | Paulson | 425/149 |
| 3,857,658 | 12/1974 | Muzsnay | 425/145 |
| 4,161,380 | 7/1979 | Bishop | 425/149 X |

*Primary Examiner*—Thomas P. Pavelko
*Attorney, Agent, or Firm*—Baldwin, Egan, Walling & Fetzer

[57] ABSTRACT

An injection molding apparatus capable of producing disposable wax patterns or the like and which apparatus includes a logic control and a servo-control especially designed to provide a substantially automatic molding process and to continuously monitor and to dynamically control certain variable parameters which are encountered during the molding process, as for example, in the present embodiment of apparatus, the control of the dynamics of fluid (wax) flow and pressure for providing substantially an automatic molding process.

The servo-control is a "closed loop" servo type of control which, in the present embodiment of apparatus, continuously provides signals which relate to the fluid (wax) flow, i.e. velocity and acceleration, and fluid pressure which is then occurring in the molding cycle, and which signals are then compared with preselected input or reference signal levels whereupon a difference therebetween is then used to adjust or drive the fluid flow and pressure control systems of the apparatus toward a dynamic or balanced state which reduces this difference in signals between the input and measured signal levels to zero.

The logic control for use with the molding apparatus is of the type that enables a substantially automatic molding cycle to be programmed for said apparatus whereby uniform product output is repeatedly obtained.

26 Claims, 11 Drawing Figures

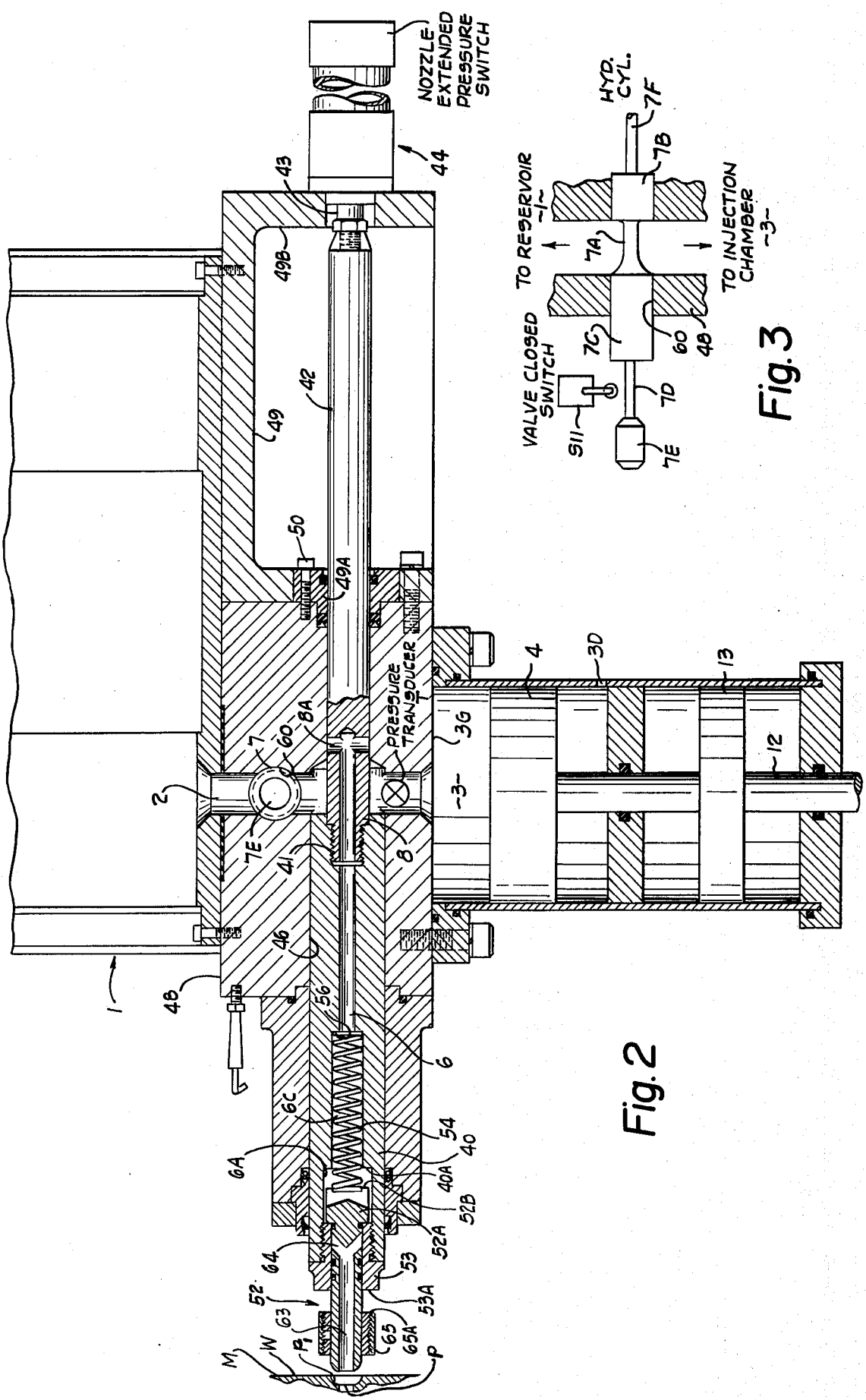

WAX INJECTION MOLDING APPARATUS AND CONTROL SYSTEM

The present invention is directed to a new and novel injection molding apparatus and to a servo-control system especially designed for use with said apparatus to control certain variable dynamic parameters which are encountered in the process of making intricate disposable wax patterns or the like for use in investment casting.

As is well known in the related art, molded disposable wax patterns are used in the investment casting process to produce metal castings which are often intricate in their geometry and require close tolerances on such characteristics as dimension and surface finish.

The wax patterns are generally produced by injecting liquid wax, specially formulated for the process, into a master mold and allowing it to solidify under pressure.

The wax pattern is then generally covered with a suitable "investment" material such as a ceramic which is then permitted to solidify. Thereafter the wax pattern is extracted from said investment material by heat or other means to leave a mold cavity therein which is an exact replica of the intricate part to be cast.

The quality and uniformity of wax patterns produced in this manner are directly related to the ability of the injection machine to accurately control the parameters of the pattern molding process, specifically the dynamics of fluid flow and pressure. Broad variations in the size, geometry, orientation and runner systems of various molds require that correspondingly wide variations in wax flow characteristics and injection pressure control be available from the wax injection molding machine.

Furthermore, some patterns are molded around fragile ceramic cores to produce hollow castings, and excessive pressures or wax flow may cause breakage and/or structural damage of the core.

The lack of adequate control of wax flow and pressure may also result in such pattern imperfections as air entrapment, flow lines, knit lines, cracking, incomplete fill, sink, incorrect size, core breakage and various other surface imperfections causing the patterns to be unusable.

It is therefore a primary object of this invention to provide a servo-control system especially designed for use with wax injection molding apparatus for controlling process parameters of said apparatus such as the acceleration, maximum flow velocity and maximum pressure of the liquid wax with a high degree of accuracy throughout the injection and solidification cycle.

Another object of the present invention is to provide a new and novel servo-control system especially designed for use with wax injection molding apparatus and which system is operable to continuously monitor and variably control dynamic parameters which may be encountered in the process of molding intricate disposable wax patterns or the like, as for example, fluid flow and pressure.

Another object is to provide a servo-control system which may be utilized to provide visual control as well as dynamic servo-control of variable dynamic parameters encountered in the process of molding intricate disposable wax patterns or the like.

Still another object of the present invention is to provide an injection molding apparatus having a logic control system capable of providing automatic molding processes and especially designed for use in the molding of disposable wax patterns which are utilized in investment casting or the like to produce metal castings.

Other objects and advantages of the present invention will become apparent to one skilled in the art to which it relates, and upon reference to the following description of a preferred embodiment thereof.

SUMMARY OF THE INVENTION

Briefly, this invention comprises an injection molding apparatus capable of producing disposable wax patterns or the like and which apparatus includes a servo-control system especially designed to continuously monitor and dynamically control certain variable parameters which are encountered during the molding process, as for example, in the present embodiment of control system, the control of the dynamics of fluid (wax) flow and pressure.

The present invention also comprises a control system for use with the molding apparatus for providing substantially an automatic molding process.

The servo-control system is a "closed loop" servo type of control which, in the present embodiment of apparatus, continuously provides signals which relate to the fluid (wax) flow and fluid pressure which is then occurring in the molding cycle, and which signals are then compared with preselected input or reference signal levels whereupon a difference therebetween is then used to adjust or drive the fluid flow and pressure control systems of the apparatus toward a dynamic or balanced state which reduces this difference in signals between the input and measured signal levels to zero.

The logic control system for use with the molding apparatus is of the type that enables a substantially automatic molding cycle to be programmed for said apparatus whereby uniform product output therefrom is accomplished.

BRIEF DESCRIPTION OF THE DRAWINGS

FIG. 2 is a longitudinal sectional view of the nozzle assembly and injection ram of the injection molding apparatus;

FIG. 3 is a longitudinal view of the spool valve used in the nozzle assembly for controlling the flow of wax between the reservoir and the wax injection chamber;

Referring to FIG. 1 of the drawings, the injection molding apparatus of the present invention is generally of the structure that is disclosed in the assignee's U.S. Pat. No. 3,535,743 issued on Oct. 27, 1970 and which has a lower platen 20 fixedly carried within a suitable framework and adapted to support the injection mold M thereon, and an upper platen 22, as diagrammatically illustrated herein, the latter being movably supported within the framework and vertically movable toward and away from the lower platen 20 to clamp the injection mold M therebetween.

Figure 8:
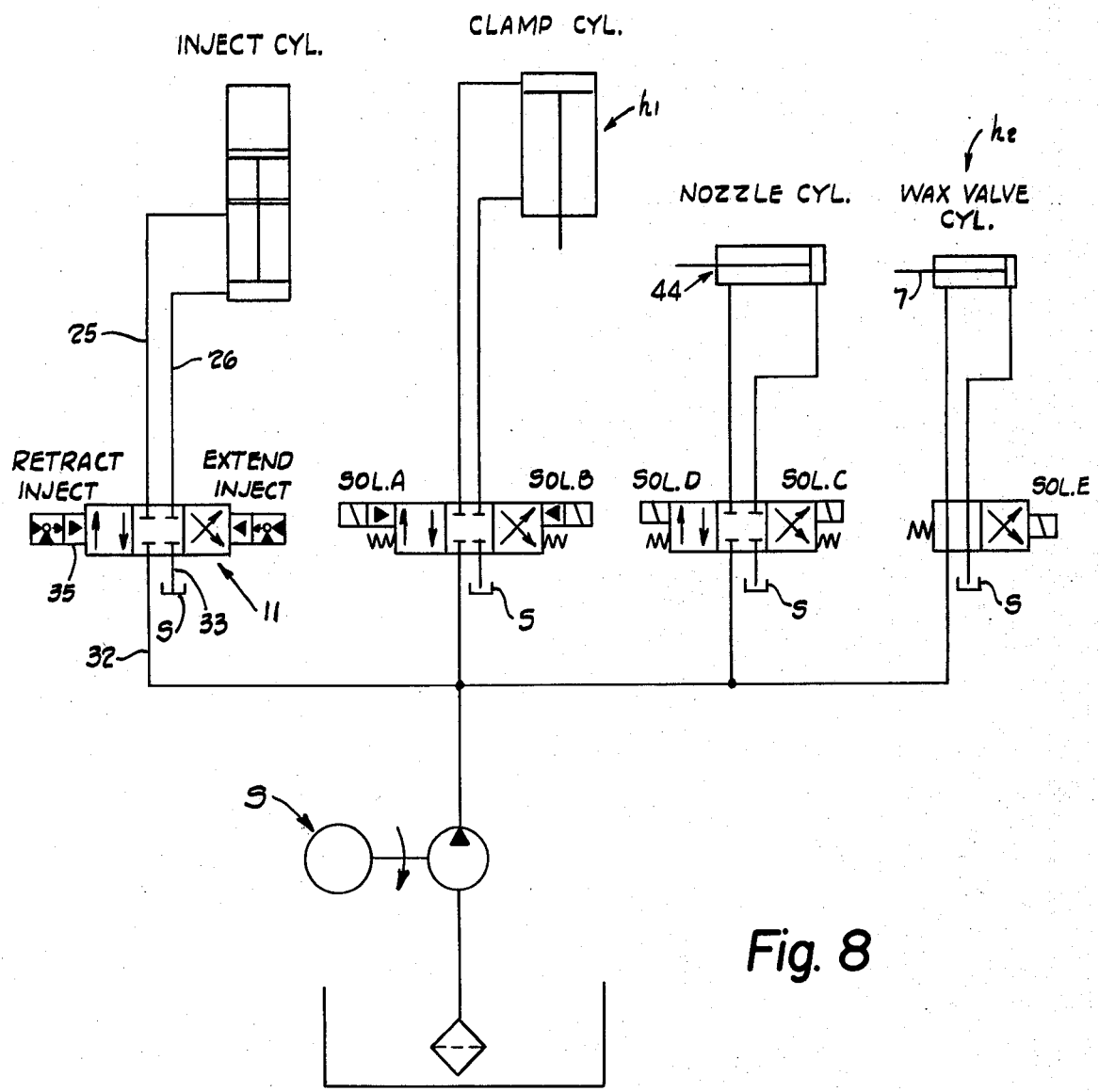
FIG. 8 is a simplified schematic diagram of the hydraulic control system.

A suitable hydraulically operated jack $h_1$ schematically shown in FIG. 8, similar to jack 23 of the aforementioned assembly of U.S. Pat. No. 3,535,743 may be utilized to raise and lower the platen 22 with respect to the lower platen 20.

A wax reservoir 1, open to atmosphere, mounted on the upper end of a pedestal 1A, said pedestal being located in the same general position with respect to the platen structure as are the vertical posts 70 in the aforesaid patented structure.

Although not shown, suitable heating and agitator means may be disposed in said reservoir to maintain the wax in a fluid condition and temperature suitable for injection molding.

The pedestal 1A is provided with a passage 2 which communicates at its upper end to the reservoir 1 and at its lower end to chamber 3 formed in housing 3A.

The chamber 3 connects through passage 2 and cross channel 6 formed centrally in movable nozzle 5 to the cavity C in mold M.

A valve 7 is intended to disconnect the reservoir 1 from the wax injection chamber 3, and a valve 8 in the nozzle 5 is intended to connect the mold cavity C through cross channel 6 in nozzle 5 to the wax injection chamber 3.

Figure 1:
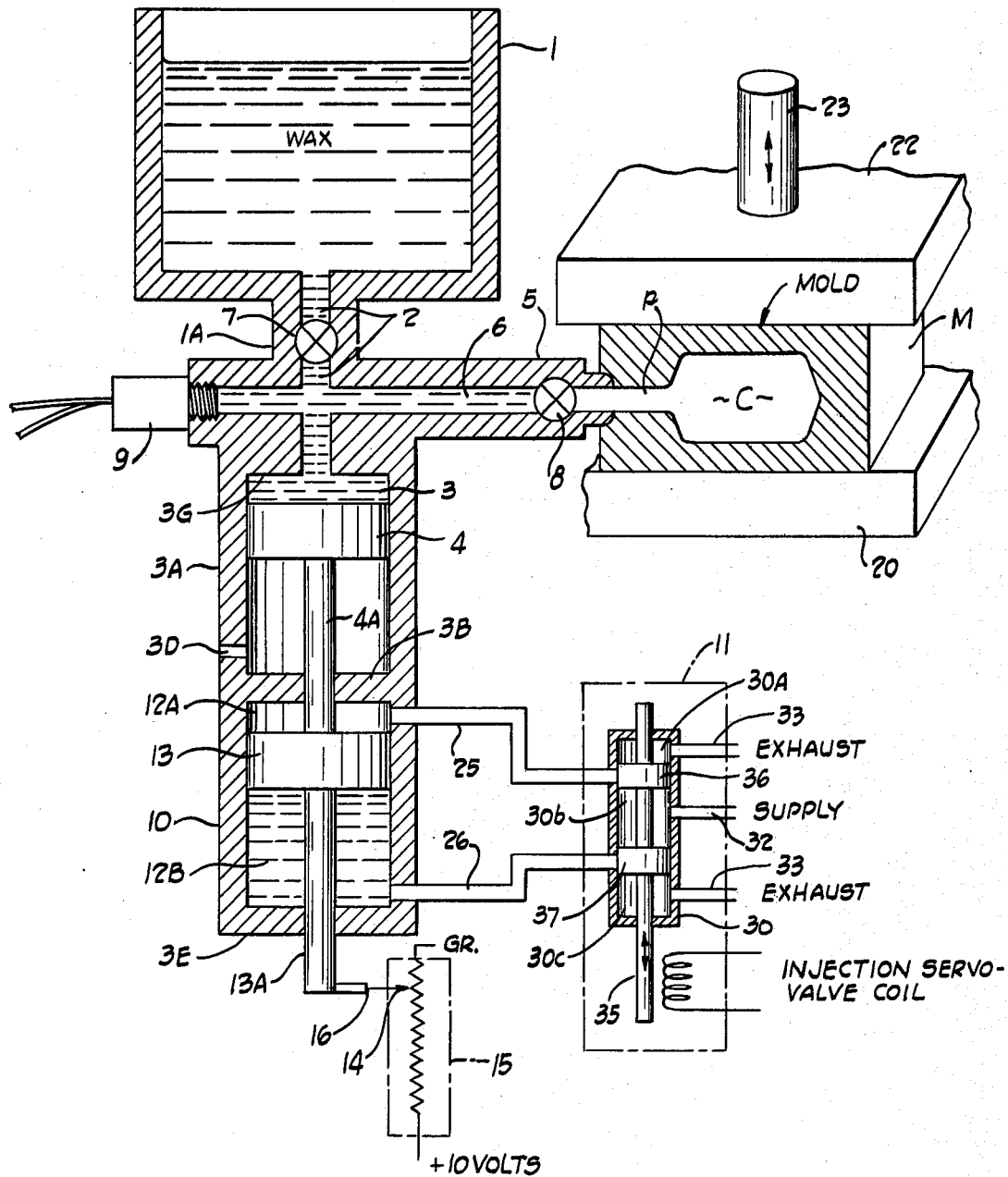
FIG. 1 is a diagrammatic view in vertical section of the basic assembly of an injection molding apparatus which encompasses the present invention.

The locations of valves 7 and 8 are merely diagrammatically illustrated in FIG. 1 whereas their actual structural assembly and operational location in the injection molding apparatus is shown in FIGS. 2 and 3.

Hydraulic chambers 12A and 12B are each connected to one end of a conduit 25, 26 respectively, the opposite end thereof connecting to one end of valve housing 30 of a servo-valve assembly 11.

A supply conduit 32 connects with the center of housing 30 and to a suitable hydraulic fluid source or sump S, FIG. 8. Similar exhaust conduits 33 likewise connect with opposite ends of said housing 30 and to said source or sump.

A spool valve 35 is slidably disposed in housing 30 and has two raised spool elements 36 and 37 formed on the valve stem 38 in spaced relation to each other to divide the interior of the housing 30 into three chambers 30a, 30b and 30c which will be, as recognized, of variable volume depending upon the position of the spool valve 35.

As best seen in FIG. 2, one physical embodiment of the nozzle 5 comprises an elongated sleeve member 40 that is threadedly attached at 41 to one end of rod member 42, the opposite end of said rod member beng attached to the piston rod 43 of hydraulic motor or jack 44.

The sleeve member 40 is disposed within a bore 46 formed in base member 48, the latter being part of the pedestal 1A as diagrammatically illustrated in the assembly of FIG. 1.

The pedestal is fixedly supported by the molding apparatus framework (not shown) to locate the component assembly in the position shown in FIGS. 1 and 2.

The rod member 42 is journally carried between depending arms 49A, 49B of an inverted U shaped bracket 49 which is attached by suitable fasteners 50 extending through arm 49A and into the vertical back wall of the base member 48.

The aforementioned wax reservoir 1 is mounted on top surfaces of the base member 48 and bracket 49 to thereby locate the same vertically over the nozzle 5.

The base member 48 which, as aforesaid, is part of the pedestal 1A as illustrated in FIG. 1, has the passage 2 formed therein, and which is seen to communicate at its upper end with the wax reservoir 1 and at its lower end with the wax chamber 3 in housing 3A.

The sleeve member 40 is provided centrally with the previously identified cross-channel 6 which is of stepped configuration and enlarged at its forward end 6A as seen in FIG. 2.

This cross-channel 6 continues in longitudinal extension into rod member 42 and communicates at its innermost end with transverse port 8A formed in said rod member.

The wax injection valve 7 is illustrated in its longitudinal configuration in FIG. 3, and is seen to be generally cylindrical having a first intermediate section 7A of reduced diameter defined between portions 7B and 7C. A second intermediate portion 7D of reduced diameter is also defined between portions 7C and end boss 7E.

The opposite end 7F of said valve 7 is rod-like and is attached to a suitable hydraulic motor of jack $h_2$, FIG. 8.

The valve 7 is slidably disposed within cross bore 60 which extends through the base member 48 transversely of passage 2 so as to communicate with the latter intermediate the wax reservoir 1 and injection chamber 3.

In the position as shown in FIG. 3, the first reduced section 7A is disposed within the passage 2 whereby the wax reservoir 1 is connected through passage 2 to the wax injection chamber 3.

With the hydraulic motor $h_2$ actuated to slide the valve 7 to the right, as viewed in FIG. 3, so that the valve portion 7C extends across the passage 2, the wax reservoir 1 is then sealed off from the wax injection chamber 3.

A retractable nozzle tip or point identified at 52 is slidably disposed in the leading end of the sleeve member 40 and projects forwardly, to the left as viewed in FIG. 2, through retainer bushing member 53 which is threadedly secured to the open end of the enlarged portion of cross-channel 6A.

The nozzle tip 52 is generally tubular in longitudinal configuration and is formed with an enlarged head at its inner end 52A, which, as shown in FIG. 2, may abut against the inner end of bushing member 53 to thereby limit its extension forwardly, or to the left as viewed in FIG. 2, of said bushing member.

A suitable coil spring 54 disposed in the intermediate portion 6C of the cross-channel 6 has its inner end seated on annular shoulder 56 and its opposite end abutting against the enlarged head 52A of the nozzle tip 52, being thus operative to urge said tip to its forwardmost position within the bushing member 53.

The nozzle tip 52 has a central passage 63, the inner end of which is bifurcated to form angularly disposed ports 64.

As shown in FIG. 2, the forward end of the nozzle tip 52 is normally spaced from the inlet port p of the mold M in its at rest position.

The nozzle 5 is slidable to the left as viewed in FIG. 2 by hydraulic motor 44 FIGS. 2 and 8 into engagement with the mold port p.

A ring member 65 is mounted over the nozzle tip 52 adjacent its end and may be used to provide support for a suitable heater (not shown) which is intended to maintain the wax flowing through the nozzle tip in a fluid state.

As shown in FIG. 2, the nozzle tip is of spherical contour at 52b which is intended to seat against a matching surface $p_1$ surrounding the mold port p to thus connect said elements in fluid sealing relation. When the hydraulic motor 44 is actuated to slide the rod member 42 and sleeve member 40 to the left sufficiently to move the nozzle tip 52 into sealing relationship with the port p of mold M continuation of the sliding movement of the sleeve member 40 will cause said sleeve member to slide over the nozzle tip 52 against the resistance of coil spring 54 until the rearward face edge 52B of the tip 52 abuts against the shoulder 40A defining the inner edge of the enlarged channel port 6A. When this relationship is attained, the annular ports 64 in the nozzle tip 52 communicate with the enlarged portion 6A of cross-channel 6.

FIG. 2 thus illustrates the "at rest" position of the nozzle assembly 5.

Figure 7A:
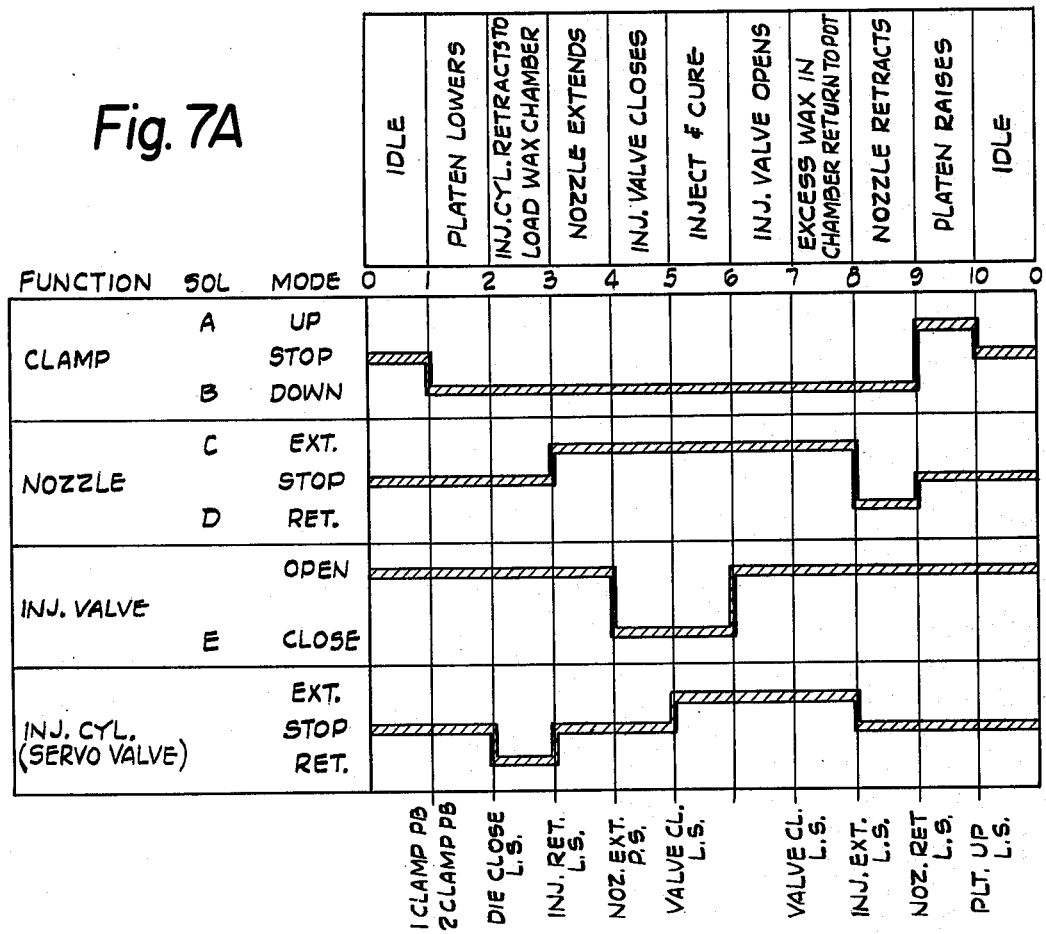
FIG. 7A is a chart of a typical cycle sequence of operation of the wax injection molding apparatus of the present invention.
Figure 7B:
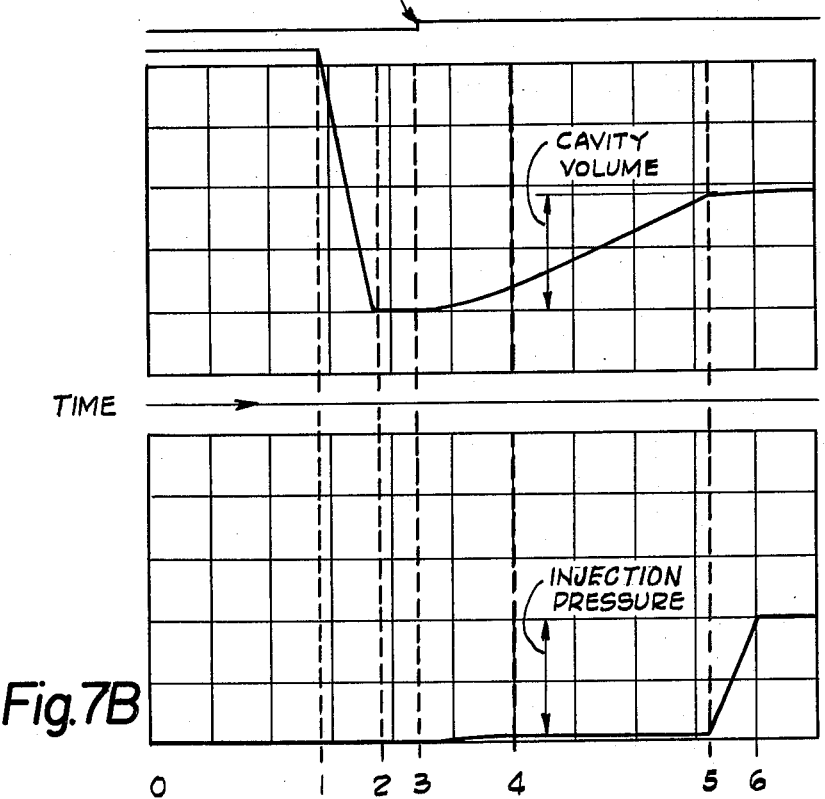
FIG. 7B is a chart of a conventional pen recorder and which shows the dynamics of fluid (wax) flow and pressure during a typical injection molding cycle.

Referring now to FIGS. 7A and 7B there is shown a diagram of a typical cycle sequence of operation of the several components of the injection molding apparatus.

The cycle is divided into ten (10) time periods each of which may be of preselected duration as will be later explained, and with the function of each of the several components listed sequentially in the order of their operation.

Initially, the apparatus is in its idle or at rest position; this period being shown between the time period 0–1. In this position, the movable platen 22 is elevated a sufficient distance above the fixed platen 20 FIG. 1, to enable the mold M to be placed on the latter with the mold and injection port p facing the nozzle 5.

Said nozzle is likewise at its at rest position wherein it is spaced from said port p such as is shown in FIG. 2.

The wax injection valve 7 is disposed in its FIG. 3 position such that wax reservoir 1 is connected through passage 2 to the injection chamber 3. The ram 4 of the injection cylinder is at rest and located in its uppermost position in chamber 3 whereat it may be disposed sufficiently closely against the upper wall 3G of said chamber to effectively provide for substantially zero volume therein.

With the above components disposed at their respective "at rest" positions, the operator may activate the control system in a manner to be later described in detail to initiate the following cycle sequence of operation.

In the beginning of the time period (1–2), FIG. 7A, 7B, the movable platen 22 is moved into engagement with the mold M to clamp and maintain the same between the fixed (20) and movable (22) platens until the end of the time period (8–9).

Next, in the time period (2–3) the ram 4 is retracted or moved rapidly at maximum velocity downwardly as viewed in FIGS. 1 and 2 to draw a sufficient quantity of liquid wax out of the reservoir 1 and into the wax injection chamber 3.

Next, at the beginning of the time period (3–4) the hydraulic motor of jack 44 FIG. 2 is actuated to move the nozzle assembly 5 to the left and to force the nozzle tip 52 into sealing relation with the mold port p.

In this position, the nozzle passage 63 communicates through the angular ports 64 with the passage 6A and the latter similarly communicates through the passages 6C and 6, cross-channel 8A ad passage 2 with the wax injection chamber 3 which is now filled with liquid wax.

The nozzle assembly 5 is maintained in this compacted position until the end of the time period (8–9).

Next, at the beginning of the time period (4–5) the valve 7 is moved by its hydraulic motor (not shown) to the right as viewed in FIG. 3 to bring the valve portion 7C into and across the passage 2 so as to seal off the wax reservoir 1 from the valve passage 6. As shown in FIG. 7A, this valve position is maintained until the end of the time period (5–6).

Next, at the beginning of the time period (5–6) the ram 4 is driven upwardly, as viewed in FIGS. 1 and 2, to force the wax from the chamber 3 through passage 2, cross-channel 8A, passage 6, angular ports 64, passage 63 and mold port p, into the mold cavity C.

The quantity of wax available in the chamber 3 is preferably greater than the actual quantity needed to fill the mold cavity C and connected passages and channels whereby a certain quantity is still in the chamber 3 with the cavity C filled.

Consequently, when the cavity C is filled, and with the ram 4 being urged or extended upwardly as viewed in FIGS. 1 and 2, the wax ahead of said ram is maintained under sufficient pressure to provide a high quality of cure for the wax pattern formed in the mold cavity C.

This pressure is maintained until the end of the time period (5–6) when the valve 7 is driven to its open position to the left to the position as viewed in FIG. 3 to thereby connect the wax reservoir 1 with passage 2 and cross-channel 8A whereat the ram 4 continues in its upward movement at maximum velocity to return the excess wax then disposed in the chamber 3 to the reservoir 1.

This function continues until the end of the time period (7–8) at which time the ram 4 is again disposed against the upper wall 3G of the chamber 3 at substantially zero chamber volume.

At the same time interval, i.e., at the end of time period (7–8) the nozzle 5 is retracted by cylinder 44 to its FIG. 2 position thereby withdrawing the nozzle tip 52 from the mold port p. At the same time, the rod member 42 is moved to the right, as viewed in FIG. 2, to bring the portion 8 of said rod member into and to extend across the passage 2.

At the end of the next time period (8–9) the nozzle 5 is fully retracted and is then stopped to await the next injection cycle.

Thereafter, at the beginning of the time period (9–10) the platen 22 is again raised thus releasing the mold M. The upward movement of the platen 22 continues to the end of the time period (9–10) whereat the platen comes to its "at rest" position.

All components then remain at their "at rest" position durig the time period (10–0) to await the next injection cycle.

Having described a typical cycle and sequence of operations of the injection molding apparatus, the logic control system and servo-control system for automatically accomplishing this operation will now be described.

Figure 5:
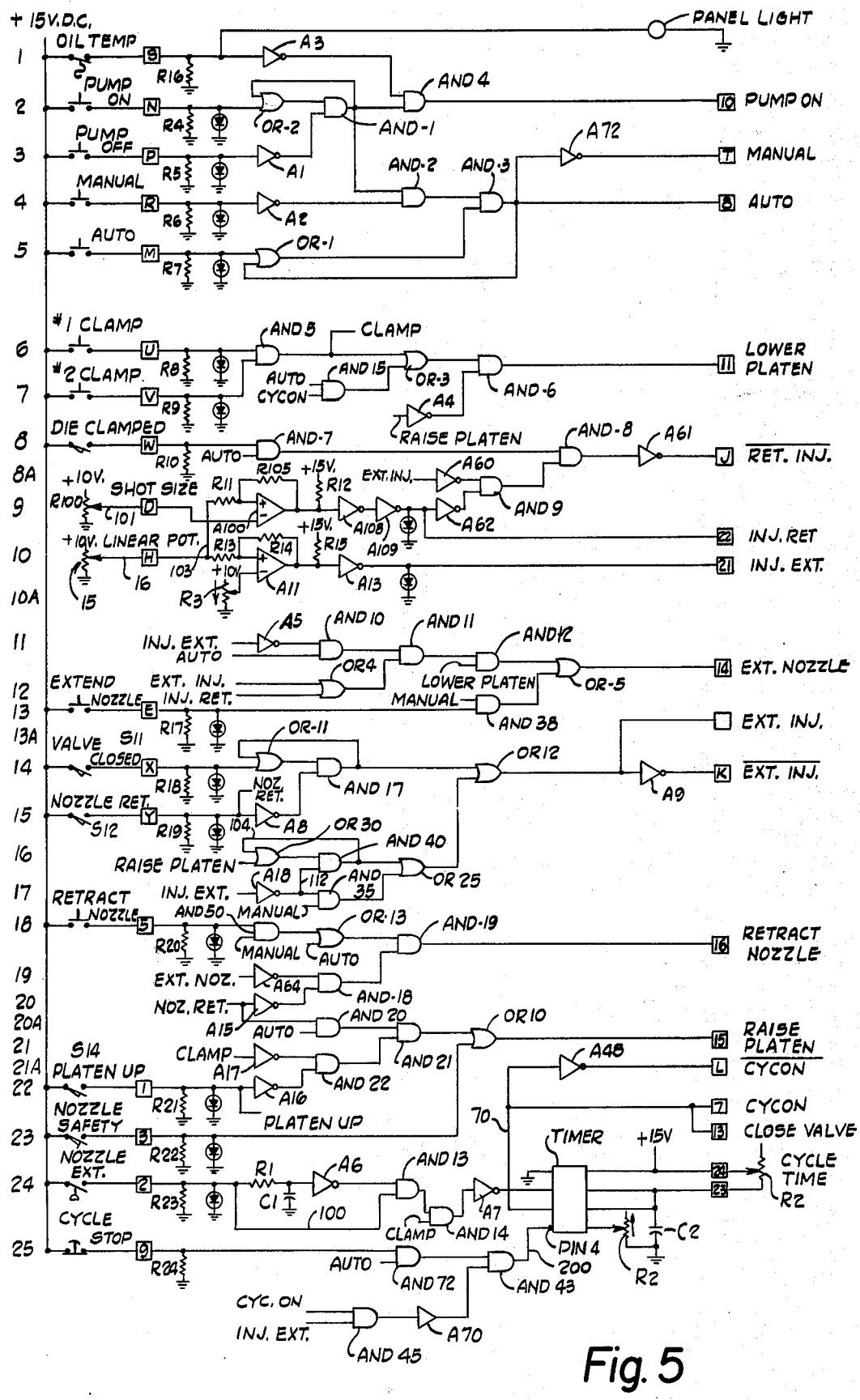
FIG. 5 is a diagrammatic wiring diagram of the logic control system.
Figure 6:
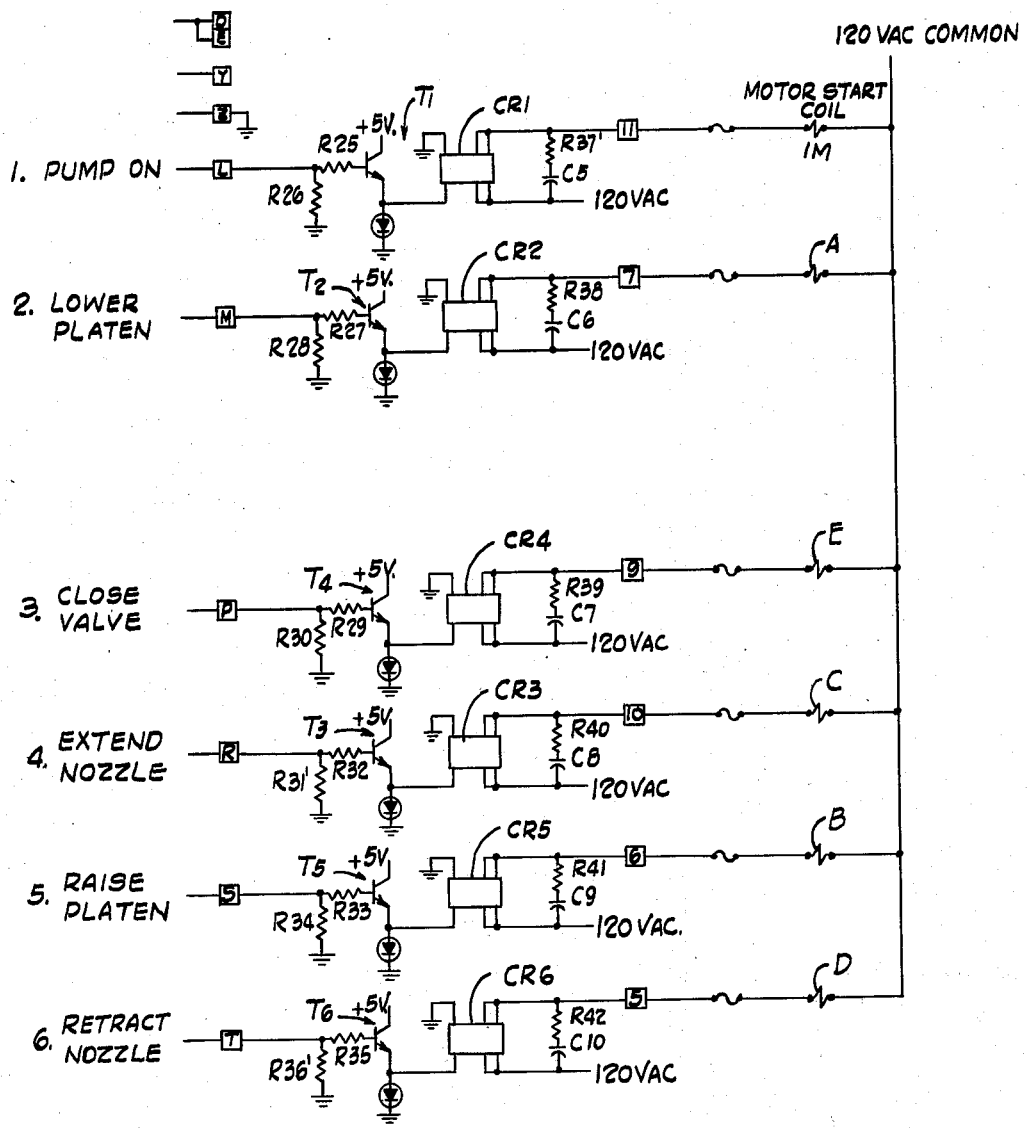
FIG. 6 is a diagrammatic wiring diagram of the solenoid control circuitry of the logic control system.

Referring to FIGS. 5 and 6 the logic control circuit and load circuit are shown, and are seen to utilize solid state components that are symbolically identified in the conventional manner understood in the art.

Referring to FIG. 5, the major circuit lines are identified at the left margin by the numerals 1–25 and reference will be made to said numerals in the following description of the aforesaid circuitry.

The machine function which is controlled by the circuitry of FIG. 5 is also identified in the righthand margin, and the load circuit to which it is connected is identified by the same machine function in the lefthand margin of FIG. 6.

It will also be recalled when reference was previously made herein to the sequence cycle diagram of FIG. 7A, that in a typical cycle of operation of the present apparatus, initially the apparatus is in its "at rest" condition whereat the movable platen 22 is in an elevated position above the fixed platen 20 a sufficient distance to permit the mold M to be placed onto the fixed platen 20 with the mold injection port p facing the nozzle 5.

Also, the operator closes the normally open push button PUMP ON in (line 2) which connects the +15 volt source to OR-2 gate.

Then if the cycle is started, the operator may close the normally open pushbutton identified in FIG. 5 (line 5) as AUTO which connects the voltage source (+15 volts) for the logic control system to terminal 2 of the OR-1 gate.

As previously referred to the injection molding apparatus is provided with a suitable hydraulic pump and hydraulic control system, a simplified embodiment of which is shown in FIG. 8, and which is used to provide control for the hydraulic motor $h_1$ for the movable platen 22, the hydraulic motor 44 for the nozzle assembly 5 and the hydraulic system 11 for the wax injector ram 4. Provided the temperature of the hydraulic oil in this control system has not risen to a danger level, the closing of the Pump On pushbutton (line 2) will provide a logic (1) on the output of the OR-2 gate which is connected to AND-1 gate as one input. The remaining input on the AND-1 gate is also logic (1) by reason that the Pump Off pushbutton (line 3) in its open condition, which results in a logic (1) output on inverter amplifier A1 and hence the output of said AND-1 gate is also a logic (1) which is then applied as one input to the AND-2 gate (line 4).

With the MANUAL pushbutton (line 4) in its open condition the other input to AND-2 gate is also logic (1) by reason that the output on inverter amplifier A2 is at logic (1), and hence the output of AND-2 gate is logic (1) which is then applied as one input to AND-3 gate.

The remaining input to AND-3 gate is also logic (1) from OR-1 gate and hence the output of AND-3 gate is also logic (1) which is then available at the AUTO terminal (righthand margin) FIG. 5.

As noted, the logic (1) output of AND-1 gate (line 2) is fed back to the input of OR-2 gate (line 2) to thereby latch on said OR-2 gate and maintain this circuit after the PUMP ON push button (line 2) is released.

The same is true of the logic (1) output of AND-3 gate which is fed back to the input of OR-1 gate to latch said gate in its logic (1) mode after the AUTO push button (line 5) is released.

The logic (1) output of AND-1 gate (line 2) is also applied as one input to AND-4 gate (line 2), the other input to this AND-4 gate being the logic (1) output from inverter amplifier A3 with the thermostat controlled OIL TEMPERATURE switch (line 1) being in its open condition.

The output of AND-4 gate is then logic (1) which is applied through its terminal PUMP ON (right margin) FIG. 5 to the same PUMP ON terminal (left margin) FIG. 6 which is the load circuit for use with the logic circuit of FIG. 5.

As seen in FIG. 6 the logic (1) input is applied to the base of coupling transistor T1 operating as an emitter follower, the emitter output being connected to the input of a conventional solid state relay CR1 which, in its present configuration is the same as a single pole normally-open relay.

The output of said relay is connected to the motor start coil SC of the pump motor 1M. When the logic (1) input is applied to the base of transistor T1, the relay CR1 is closed to connect the 120 volt supply to the motor start coil SC whereby the latter is engaged to start the pump motor 1M and pressurize the hydraulic system.

The present embodiment of control system is intended to prevent inadvertent operation of the injection molding apparatus and to accomplish this the control system includes two clamp push buttons identified in FIG. 5 as #1 clamp (line 6) and #2 clamp (line 7) and which may be spaced apart a distance to require both hands of the operator in order to simultaneously operate the same. Likewise, said push buttons are of the type that return to their normally open position when the operator lifts his hand therefrom.

When the operator closes both push buttons #1 clamp and #2 clamp, logic (1) input is applied to both inputs of the AND-5 gate, FIG. 5 (line 7) thus providing logic (1) output from said AND-5 gate and to one input of OR-3 gate (line 6). The logic (1) input to OR-3 gate provides a logic (1) output on said OR-3 gate which is applied as one input to AND-6 gate (line 6). The other logic (1) input to said AND-6 gate comes from the output of inverter amplifier A4 (line 7) the input of which is taken from the output of OR-10 gate (line 21) RAISE PLATEN terminal (righthand margin).

The logic (1) output from AND-6 gate (line 6) is then applied through its terminal LOWER platen (righthand margin) to the same terminal (Lower Platen) line 2 of the load circuit diagram of FIG. 6 which is then applied to the base of coupling transistor T2 connected in its emitter follower configuration, the emitter output of which is connected to the input of solid state relay CR2 which is the same as relay CR1.

The output of relay CR2 is connected to solenoid coil A whereby as relay CR2 is closed said coil is connected to the 120 volt source also connected to said relay, and the hydraulic motor $h_1$ is energized and the movable platen 22 is lowered into clamping engagement with the mold M.

When the platen 22 is in clamped position with respect to mold M, the normally-open switch identified as DIE Clamped Switch (line 8) FIG. 5 is closed. Although not shown, this Die clamped switch may be mounted on the apparatus to be closed by the platen 22 as it moves into clamping engagement with the mold M.

As this switch is closed, a logic (1) input is applied to AND-7 gate (line 8), the other input being also logic (1) from the AUTO terminal (righthand margin, line 4). A logic (1) output from AND-7 gate (line 8) is then applied to input of AND-8 gate, the other input to said gate being also the logic (1) output from AND-9 gate.

Figure 4:
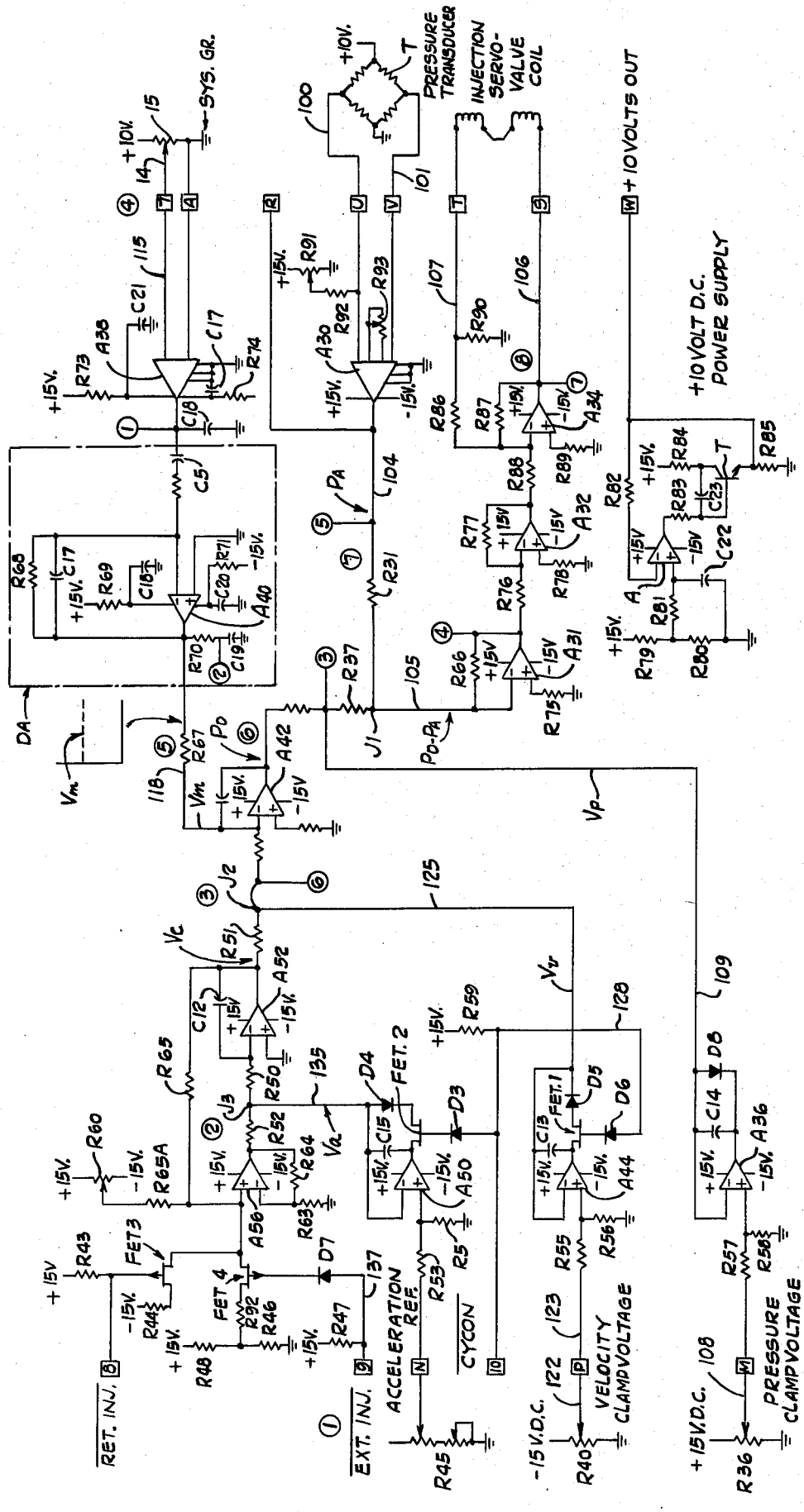
FIG. 4 is a diagrammatic wiring diagram of the closed loop servo-control system.

The AND-8 gate output is then logic (1) which is then applied through terminal $\overline{Ret\ inj}$ (righthand margin) FIG. 5, (line 9) to the same terminal (lefthand margin), FIG. 4, of the servo-control system later to be described in detail. Suffice to say at this juncture that when this logic (1) output from AND-8 gate (line 8) FIG. 5 is applied to the servo-control system, current flows through the Injection Servovalve Coil as shown in FIGS. 1 and 4 to drive the spool valve 35 upwardly as viewed in FIG. 1 until the spool element 36 opens conduit 25 to the fluid chamber 30b and hydraulic fluid supply conduit 32. Hydraulic fluid then flows into the chamber 12A of the housing 3A and forces the piston 13 downwardly which likewise moves or retracts the ram 4 downwardly to draw fluid wax from the wax reservoir 1, through the valve 7 and passage 2 into the wax chamber 3.

As will be later described in detail, the ram 4 moves in its retracted direction (downward as viewed in FIG. 1) until a predetermined quantity of liquid wax is drawn into the chamber 3 at which time the spool valve 35 moves to the position shown in FIG. 1 stopping the downward movement of the piston 13.

At this time, the nozzle 5 is extended to the left as viewed in FIG. 2 so that the nozzle tip 52 is inserted into the mold injection port p.

To accomplish this, reference is directed to FIG. 5, lines 10 and 11. When the retracted movement of the ram 4 is stopped with said ram in its retracted lower position, the signal output at terminal INJ EXT (line 10 righthand margin) is logic (0). This signal output is connected to terminal INJ EXT (line 11) which is the input to inverter amplifier A5, the output of which is then logic (1) and applied to one input of AND-10 gate (line 11). The remaining input to said gate is the logic (1) signal from the AUTO terminal (line 4 righthand margin) FIG. 5 at which time the output of said AND-10 gate is logic (1) which is applied to one input of AND-11 gate (line 11).

The output signal at terminal INJ RET (line 9) righthand margin FIG. 5, is applied to INJ RET input terminal (line 12) of OR-4 gate and the output signal level of said OR-4 gate is then logic (1) which is then applied as one input to said AND-11 gate.

The output signal of said AND-11 gate is then logic (1) which is applied to one of the inputs of AND-12 gate (11).

The remaining input of said AND-12 gate is the logic (1) signal from the LOWER platen terminal (line 6) righthand margin, which signal level is sustained at this juncture so long as the operator maintains both #1 clamp and #2 clamp pushbuttons closed. Should the operator for any reason release one or both of said clamp pushbuttons up to the point in time when the nozzle 5 has become fully connected to the mold port p, movement of the nozzle 5 to the left, as viewed in FIG. 2, will immediately stop and the platen 22 will then raise up to its uppermost position to free the mold M.

The output signal level of AND-12 gate (line 11) is then logic (1) which is then applied as one input to OR-5 gate (line 11), the output of said OR-5 gate being then also at logic (1) level which is applied through EXT NOZ terminal righthand margin (line 11) to the same input terminal of load circuit, FIG. 6, line 4 which is connected to the base of transistor T3, the emitter output of which is connected to the input of the solid state relay CR3 which is the same as relay CR1.

Said relay CR3 is thereby activated to its closed position to apply the connected 120 volt source to solenoid coil C whereby the latter is energized to actuate the hydraulic motor 44 to move the nozzle 5 to the left as viewed in FIG. 2 toward the mold port p.

As the nozzle tip 52 engages the mold port p its movement is stopped and the surrounding sleeve member 40 continues its movement thereover thereby compressing coil spring 54 until the rearward edge 52B of nozzle tip 52 abuts against the shoulder 40A of sleeve member 40. At this instance, the nozzle 5 is in its fully extended position and the passage 8A in the rod member 42 is connected with the passage 2 to thereby connect the wax chamber 3 to nozzle passage 6.

Nozzle Extended Pressure switch member FIG. 5 (line 24) is a conventional pressure actuated normally-open switch, and when the nozzle 5 is in its full extended position against the mold M, said switch (line 24) is closed.

When this occurs, the 15 volt source (logic (1) level) is connected to the input of a time delay network consisting of resistor $R_1$ and capacitor $C_1$ (line 24) the output of which is connected to the input of inverter amplifier A-6 (line 24). Said voltage source is also connected directly by conductor 100 to one input of AND-13 gate; the remaining input to said AND-13 gate being connected to the output of said amplifier A-6.

With the nozzle extended switch open, the output signal level of amplifier A6 is logic (1), as well as its connected input of AND-13 gate. Hence, at the instant said nozzle extended switch is closed, the logic (1) signal level is immediately applied to the remaining input of AND-13 gate and the output of said AND-13 gate is then also logic (1). This signal level is then applied to the input of AND-14 gate. The remaining input of said AND-14 gate is connected to the clamp (CLAMP) terminal (line 6) FIG. 5, the signal level of which is also at logic (1) level.

The output signal level of AND-14 gate is then logic (1) which is then applied to the input of inverter amplifier A7 (line 24) whereby its output is then at logic (0) level.

This signal output from amplifier A7, logic (0) may also be called the "starting pulse" and is applied to the input of a solid state timer identified at Timer FIG. 5 (line 24) which may be of any suitable commercially available unit such as the Model NE/SE 555 Timer made by Signetics.

When this amplifier output signal or "starting pulse" is applied to the timer, an output signal logic (1) is generated therein and applied through conductor 70 (line 23) to terminals "CLOSE Valve" and CYCLE ON "CYCON" righthand margin, FIG. 5.

This output signal is also applied via input terminal CLOSE VALVE (line 3) lefthand margin FIG. 6 which connects to the base electrode of transistor T4, the emitter output of which is connected to the input of solid state relay CR4 the latter being similar to relay CR1.

Said relay CR4 is activated by said signal to apply its connected 120 volt source to solenoid E, FIGS. 6 and 8, which then actuates hydraulic motor $h_2$ moving the wax injection valve 7 to its closed position whereat the valve portion 7C of said valve FIG. 3 is positioned in the passage 2 effective to seal off the wax reservoir 1 from the wax chamber 3.

At this point in the operative cycle, the operator may let go of or otherwise release the #1 and #2 clamp pushbuttons (lines 6 and 7) FIG. 5 and the automatic operative cycle will continue and the movable platen 22 will remain in its clamped position with respect to the MOLD M.

After the time delay network, resistor R1 and capacitor C1, times out, the output signal level of inverter A-6 (line 24) goes to logic (0) level which is then the signal level of one input to AND-13 gate also goes to logic (0) level.

The signal level output of AND-14 gate also goes to logic (0) level which is applied to the input of inverter amplifier A7 whereby its output is then at logic (1) signal level which is operable to terminate the "STARTING PULSE" of the timer.

As a result, the output signal level of the timer (conductor 70) goes to logic (1) level to initiate the "CYCLE ON" signal, which appears on the output terminal CYC ON (line 23) righthand margin, FIG. 5.

This output terminal CYC ON is connected to one input of AND-15 gate (line 7) FIG. 5, the other input being then at logic (1) level is connected to the output terminal AUTO (line 4) FIG. 5.

When this occurs, the output signal of said AND-15 gate goes to logic (1) level and is applied to the input of OR-3 gate (line 6). The output signal of OR-3 gate is then at logic (1) level and applied as one input to the AND-6 gate (line 6).

The remaining input to AND-6 gate from the output of inverter amplifier A4 is likewise at logic (1) level.

Hence, the output signal level of AND-6 gate is at logic (1) level.

This output signal of AND-6 gate is connected to output terminal, righthand margin, LOWER PLATEN (line 6) FIG. 5 which is connected to the same input terminal lefthand margin LOWER PLATEN (line 2) FIG. 6 being thus effective to maintain the energization of the solenoid A and to therein maintain the movable platen 22 in its clamped or lowered position with respect to the MOLD M.

During the "time period" as above identified between the application of the AUTO signal to the input of AND-15 gate and the application of the CYC ON signal to the other input of said AND-15 gate, the operator is required to maintain the #1 and #2 clamp pushbuttons (lines 6 and 7) FIG. 5 closed.

Upon receipt of said input signals to this AND-15 gate, i.e., the AUTO and CYC ON signals, the nozzle 5 has been fully extended into engagement with the mold port p and into wax injection position with respect thereto.

If any malfunction of the apparatus occurs during this "time period" and prior to the receipt of said CYC ON input signal on said AND-15 gate, the operator need only release the #1 and #2 clamp pushbuttons whereby they automatically return to their open position as shown in FIG. 5 and the apparatus immediately returns to its "idle condition" wherein the nozzle 5 is returned to its FIG. 2 position and the platen 22 is moved to its raised position.

Conversely, upon receipt of the CYC ON signal to the input of AND-15 gate, the operator may then release #1 and #2 clamp pushbuttons and the automatic mode of operation of this apparatus will continue.

The Timer will continue to provide this CYC ON signal for a time period that is determined by the resistor-capacitor time delay network identified at variable R2 and C2, shown in FIG. 5 (line 24) as being connected to the TIMER and referred to as "Cycle Time".

Selective adjustment of the variable resistor R2 provides a corresponding change or adjustment to the period of the Cycle Time, as will be understood.

When the valve 7, FIG. 3 is moved to its closed cross channel 2 position whereat portion 7c extends across said channel 2, the valve part 7E operates a normally-open limit switch identified in (line 14) FIG. 5 as the VALVE CLOSED limit switch (S11).

When this occurs, the voltage source (+15 volts D.C.) is applied to the input of OR-11 gate (line 14) whereby the output signal level of said OR-11 gate then goes to logic (1) level.

This logic (1) signal is applied as one input to AND-17 gate (line 14) and the remaining input to said AND-17 gate is also at its logic (1) level by reason of the NOZZLE RETRACTED limit switch (line 15), being open to thereby provide a signal output from inverter amplifier A-8 (line 15) to be at its logic (1) level.

The output signal level of said AND-17 gate is then at logic (1) which signal level is fed back to the input of OR-11 gate to then lock in said AND-17 gate in its logic (1) mode.

The output signal level logic (1) of said AND-17 gate is then applied to the input of OR-12 gate causing the output of said OR-12 gate to go to its logic (1) level.

This output signal logic (1) level is connected through inverter amplifier A9 to terminal $\overline{\text{EXT. INJ}}$ (extend injector ram) line 15, FIG. 5 to input terminal $\overline{\text{EXT. INJ}}$ FIG. 4 which, in the manner as will be later explained, current will flow in the INJECTION SERVOVALVE COIL FIG. 4, in such direction as to drive the spool valve 35 downwardly as viewed in FIG. 1 until the spool element 37 opens conduit 26 to the fluid chamber 30b and the hydraulic fluid supply conduit 32.

Hydraulic fluid then flows into the chamber 12B of ram housing 3A and forces the piston 13 and attached ram 4 upwardly to force the fluid wax out of the wax chamber 3 through the communicating nozzle channels 2 and 6 and mold port p into the mold cavity C.

The mold cavity C begins to fill with fluid wax. The duration of the Cycle Time (resistor R2 and capacitor C2) signal (CYC ON) produced by the TIMER is preselected by adjustment of said resistor R2 so that the mold cavity C is completely filled with wax and sufficient time is allowed for solidification of the liquid wax before the Cycle Time (CYC ON) signal is terminated.

Likewise, as will be later further explained, the quantity of wax that is initially disposed in the chamber 3 is somewhat greater than it takes to completely fill the mold cavity C so that when the said cavity C is filled, some wax is still in the chamber 3 and is being subjected to the pressure exerted by the upward urging of the ram 4.

When the time delay network, i.e., resistor R2 and capacitor C2 times out the (CYC ON) cycle time signal of the TIMER FIG. 5 (line 24) terminates to provide a logic (0) signal level on Timer output conductor 70, which is applied to the output terminal CLOSE VALVE righthand margin (line 23) FIG. 5 and to the input terminal CLOSE VALVE, lefthand margin (line 3) FIG. 6 which is effective to deenergize solenoid E whereby the valve 7 returns to its FIG. 3 position again connecting the chamber 3 to the wax reservoir 1.

When this occurs, the upward urging of the ram 4 forces the wax then remaining in the chamber 3 back into the reservoir 1.

When the valve 7 moves to its FIG. 3 position, the limit switch S11 opens; however with the AND-17 gate and the OR-11 gate locked together the logic (1) output from AND-17 gate is retained whereby the upward movement of the ram 4 is likewise maintained.

The upward ram movement hence continues carrying the slider 14 of the linear potentiometer 15 toward the preset voltage level previously established by rheostat R3 (line 10A) FIG. 5, which rheostat voltage level is applied to one input of instrumentation amplifier A11 (line 10) FIG. 5.

The potentiometer slider 16 (line 10) FIG. 5 is connected to the remaining input of said amplifier A11, and when the voltage levels of said amplifier A11 inputs are equal or reach the "threshold value", the output of amplifier A11 goes to its logic (0) level which is, in turn, applied to the input of inverter-amplifier A13 to cause the signal output from said amplifier A13 to go to its logic (1) level.

This logic (1) signal from amplifier A13 is applied to the output terminal INJ EXT (line 10) to input terminal INJ EXT (line 17, FIG. 5) of the inverter amplifier A18. The output of said amplifier A18 is thus at its logic (0) level which is applied to one input of AND 35 gate, the other input to said AND 35 gate, i.e., MANUAL terminal being also at logic (0) level by reason of the output of the inverter-amplifier A72 line 3 being at its logic (0) level and connected to the output terminal MANUAL (line 3) which is connected in turn to said MANUAL input terminal of said AND 35 gate.

The output signal of the AND 35 gate is therefore at its logic (0) level which is connected to the input of OR-25 gate, the output signal level of said OR-25 gate being logic (0) and connected to one input of OR-12 gate.

The output signal level of OR-12 gate is also logic (0) which is connected to the input of inverter amplifier A9 to provide a logic (1) signal output to the logic circuit output terminal $\overline{\text{EXT INJ}}$.

This output terminal $\overline{\text{EXT INJ}}$, as aforementioned, is connected to the servo-control input terminal $\overline{\text{EXT INJ}}$ FIG. 4, and this logic (1) signal from inverter amplifier A9 is effective to turn off the FET 4 switch and stop the upward urging of the ram 4 whereby said ram is then at its uppermost position "zero chamber 3 volume" being retained thereat until the next cycle of operation.

This logic (1) signal from amplifier A13 is also applied through output terminal INJ EXT (line 10) righthand margin, FIG. 5 to input terminal INJ EXT (line 11) FIG. 5 of inverter-amplifier A5, the signal output of which then reverts to its logic (0) level.

This logic (0) signal level is then applied to the input of AND-10 gate (line 11) FIG. 5 causing the output signal level of said AND-10 gate to go to its logic (0) level, and which results, sequentially, in the output signal level of AND-11 gate (line 11) to revert to its logic (0) level, the output signal of AND-12 gate to go to its logic (0) level, and the output signal of OR-5 gate to revert to its logic (0) level which is then available at output terminal EXT. NOZZLE righthand margin (line 11) FIG. 5.

With this logic (0) signal level on said output terminal EXT. NOZZLE, the nozzle 5 is thereby withdrawn in the following manner.

This logic (0) signal is also connected through said output terminal EXT. NOZZLE to the EXT. NOZZLE input terminal of inverter amplifier A64 (line 19) FIG. 5 causing its output signal level to rise to its logic (1) level which is then applied to one input of AND-18 gate (line 20). The remaining input of said AND-18 gate is connected to the output of inverter-amplifier A15 which is at its logic (1) level. As a result, the output of AND-18 gate goes to its logic (1) level which is then applied to one input of AND-19 gate (line 18); the remaining input of said AND-19 gate being the output of OR-13 gate (line 14) which is also at its logic (1) level by reason that the input thereto is the logic (1) AUTO signal output of the AND-3 gate (line 4).

As a result, the signal output of AND-19 gate goes to its logic (1) level which is then applied via the output terminal RETRACT NOZZLE (line 18) FIG. 5 righthand margin; and to the same input terminal (line 6) FIG. 6 of the solenoid control circuitry wherein said signal is connected to the base of transistor T6 of the relay circuit for solid state relay CR6 which is the same configuration as relay CR1.

Said relay CR6 is thereby actuated to its closed position to apply the connected 120 volt source to the solenoid coil E whereby the latter is energized to actuate the hydraulic motor 44 and retracts the nozzle 5 to the right as viewed in FIG. 2 away from the mold M and its port p.

The nozzle 5 continues in its retraction movement until the rod member 42 engages and closes the limit switch NOZZLE RETRACTED, S12, (line 15) FIG. 5. This connects the +15 volt source to the output terminal NOZ RET (line 15) FIG. 5 which is also connected to the input of inverter-amplifier A15 (line 20) causing the output signal thereof to go to its logic (0) level.

As a result, the following sequentially occurs. The output signal of the AND-18 gate (line 20) goes to its logic (0) level; the output signal of the AND-19 gate (line 18) goes to its logic (0) level which is then connected by the output terminal RETRACT NOZZLE, righthand margin (line 18) FIG. 5 to the same input terminal (line 6) FIG. 6 which deenergizes solenoid coil D and stops the retraction movement of the nozzle 5.

Closing of the Nozzle Retracted limit switch S12 also causes the following sequence of events to occur.

A logic (1) level of signal is applied to one input of AND-20 gate (line 20A) the remaining input being connected to the AUTO terminal (line 4) and already at its logic (1) signal level. The output signal of said AND-20 gate is applied to one input of AND-21 gate (line 20A).

The PLATEN UP limit switch S14 (line 22) is in its open position, hence the input signal to inverter-amplifier A16 (line 22) is at logic (0) level causing its output signal to be at its logic (1) level. This output signal logic (1) level is connected to one input of AND-22 gate (line 21A).

The remaining input of said AND-22 gate is connected to the output of inverter-amplifier A17 which is then in its logic (1) signal level by reason that its input, CLMP terminal (line 21, 6) is at logic (0) level because the #1 and #2 clamp pushbuttons (lines 6 and 7) are in their open position.

The signal output of AND-22 gate (line 21A) is hence at its logic (1) level, and is connected to one input of the AND-21 gate (line 20A).

The output signal of said AND-21 gate is then at its logic (1) level which is applied to the input of OR-10 gate (line 20A) causing the output signal thereof to also be at its logic (1) level.

This logic (1) signal is then connected through output terminal Raise Platen righthand margin (line 20A) FIG.

to the same input terminal (line 5) FIG. 6 of the solenoid control circuitry wherein said signal is connected to the base of transistor T5 of the relay circuit for solid state relay CR5 which is also the same configuration as CR1.

Said relay CR5 is thereby actuated to its closed position to apply the connected 120 volt source to the solenoid coil B effective to energize the same whereby the hydraulic motor $h_1$ is reversably connected to the hydraulic source of fluid effective to raise the movable platen 22 upwardly to free the mold M.

When the platen 22 is raised to its uppermost position, the PLATEN UP limit switch S14 (line 22) FIG. 5 is closed thereby applying the voltage source (+15 volts) (logic 1) signal level to the input of inverter-amplifier A16 which results in the output signal thereof to go to its logic (0) level, thus causing the following sequence of control events.

The signal output of AND-22 gate (line 21A) reverts to its logic (0) level; the signal output of AND-21 gate (line 20A) returns to its logic (0) level; the output signal of OR-10 gate (line 20A) reverts to its logic (0) level, and thus resulting in the deenergization of solenoid coil F (line 5) FIG. 6 to thus deactivate the hydraulic motor $h_1$ and stop the upward movement of the platen 22.

At this instant in the automatic mode of operation for the molding apparatus, all components thereof have been returned to their normal "at rest" or idle position as depicted graphically in FIG. 7A, to await the next cycle of operation.

As heretofore mentioned, the present invention is also directed to a new and useful servo-control system especially designed to monitor and variably control certain dynamic operational parameters which are encountered in the process of casting intricate wax patterns by the present apparatus.

In the present embodiment of servo-control system, as is schematically shown in FIG. 4, the acceleration, velocity and pressure of the liquid wax is continuously monitored during the casting process and the system is then responsive thereto to variably control the magnitudes thereof with a high degree of accuracy throughout the wax injection and solidification cycle.

As will be understood in the art, a most straightforward way to control a dynamic system parameter is to provide a signal that is proportional to what is the desired value or condition for the parameter; have the control system provide a signal that is representative of the actual condition of the parameter that is occurring during the intended cycle to be controlled; have the control system compare the desired value to the actual value of the parameter and to provide an error signal therebetween which is then used to correspondingly variably adjust the apparatus so that the actual value of parameter under surveillance closely approximates the desired value.

The present servo-control system utilizes this principle of control, and in its present configuration utilizes what will be referred to as two "servo-control loops" one of which is identified as the "pressure control loop" and the second as the "velocity control loop".

With reference to FIGS. 2 and 4, the pressure control loop comprises a transducer T mounted within the base member 48 of the injection apparatus so as to be exposed to and responsive to the fluid pressure of the wax flow between the chamber 3 and channel 2.

As shown in FIG. 4, transducer T is in the form of a D. C. bridge being connected to a source of direct current voltage that is precisely +10 volts D. C. and system ground.

This precise 10 volts D. C. is provided by the Power Supply schematically shown in the lower righthand corner of FIG. 4 identified therein by +10 volt supply and which includes operational amplifier A connected to transistor follower T and which is operable to provide the precise magnitude of +10 volts D. C.

The transducer T has a pair of output conductors 100, 101 which are connected to the input of instrumentation amplifier A30.

The output of amplifier A30 is connected by conductor 104 to one end of resistor R31, the opposite end of said resistor connecting by conductor 105 to one input of amplifier A31 functioning as a comparator, the remaining input of said amplifier A31 connecting to system ground.

The output of amplifier A31 connects to one input of unity gain amplifier A32, the output of which, in turn, connects to the input of current amplifier A34.

The output of amplifier A34 connects through conductor 106 to one end of the injection servovalve coil, the opposite end of said coil connecting through conductor 107 and resistor R86 back to the input of said amplifier A34 to thus complete the loop.

Also connected to this control loop is a source of direct current voltage identified in FIG. 4 as a PRESSURE CLAMP voltage.

The PRESSURE CLAMP voltage comprises a variable resistance of potentiometer R36 connected across a precise +15 volt D.C. source and system ground, and which has its wiper or movable contact 108 connected to the input of amplifier A36.

The output of said amplifier A36 connects by conductor 109 to one end of resistor R37, the opposite end of which connects at junction point J1 with the aforementioned conductor 105.

As will be later explained in greater detail, the potentiometer R36 is pre-set by the operator to a voltage magnitude $V_p$ that is representative of the maximum pressure parameter that is desired for the fluid wax in order to provide a high quality wax casting of the part to be molded.

The voltage magnitude $P_D$ (desired pressure parameter) derived from the amplifier A42 is one input into the "pressure control loop" which is then compared ($P_D$-$P_A$) at junction point J1 with the signal output (actual pressure $P_A$ output of transducer T) of amplifier A30.

This parameter ($P_D$-$P_A$) representing the difference between desired pressure and actual encountered pressure is then fed back through amplifiers A31 and A32 and current amplifier A34 to provide a current signal which is then applied to the injection servovalve coil causing a corresponding shift of the valve 38 which, in turn, adjusts the actuation of the ram 4 to result in a corresponding increase or decrease in the ram movement which, as will be understood, results in an increase or decrease in the fluid wax pressure such that the actual encountered pressure approaches and equals the desired pressure.

The "Pressure Clamp Voltage" $V_p$ provided by the wiper arm 108 is buffered by amplifier A36. The buffered output of amplifier A36 is blocked from conductor 109 by diode D8 which is non-conducting. The voltage Pd which is representative of the desired pressure to the pressure loop and derived from amplifier A42 is free to vary as the system dynamics indicates until such time the pressure reference voltage Pd attempts to exceed the pressure clamp voltage Vp (become more positive). Then diode D8 begins to conduct and holds or clamps the voltage Pd at the valve set by the wiper of R36, i.e. Vp. This prevents the pressure from exceeding the maximum value set by R36.

The resultant movement of the ram 4 caused by the signal parameters ($P_D$-$P_A$) also generates what will be hereinafter referred to as a "velocity signal" which is also monitored by the present servo-control system, and as will be hereinafter described in detail, is compared with a preselected voltage signal (Vc) that is representative of a desired velocity for the ram 4 and then connected into the aforementioned pressure control loop and effective to cause the signal output of current amplifier A34 to be correspondingly adjusted.

To accomplish this, a second control loop heretofore referred to as the "velocity control loop" is seen to comprise the linear potentiometer 15, the stationary resistance element of which is connected across a precise voltage source of +10 volts D. C. and system ground. The movable wiper arm 14 of said potentiometer is connected to the piston rod 13A that is movable with the ram 4. As shown in FIG. 1, when the ram 4 is moving toward its upper position (fully extended), the wiper arm 14 is moving toward the grounded end of the potentiometer resistance element, and conversely, with the ram 4 moving downward the wiper arm 14 is moving toward the +10 volts D. C. level With this selected parameter the potentiometer yields a voltage signal identified herein as Vx that is directly related in value, i.e. between 0 and +10 volts to the position then being occupied by the ram 4.

The wiper arm 14 (FIG. 4) is seen to be connected by conductor 115 to one input (positive terminal) of instrumentation amplifier A38, the (negative terminal) of said amplifier being connected to the system ground.

The output of amplifier A38 is connected to capacitor C5 which is one input of a differentiator amplifier circuit identified in its entirety at DA.

As will be understood, velocity of the ram 4 is the rate of change of position of said ram with respect to time.

The operational characteristics of amplifier A38 are preselected so that its output signal equals the signal input obtained from the potentiometer 15; said amplifier A38 functioning to provide a high input impedance for the wiper arm 14 of said potentiometer to thus insure linearity of the amplifier output signal and thus representative of the movement of the ram 4 and connected piston rod 13A.

The signal output of said amplifier A38, is proportional to the position of the ram.

The capacitor C5 in accordance with the remaining circuitry enclosed in the box labeled "DA" passes a signal which is proportional to the time rate of change of the voltage of amplifier A38. Since the output voltage Vx to amplifier A38 is proportional to the ram position, the output of amplifier A40 is therefore also proportioned to the time rate of change of position or velocity of ram 4.

The output signal of amplifier A40 referred to as Vm is therefore a signal having a value that is proportional to the rate of change of the input signal which, in turn, is representative of the velocity of the ram 4.

As aforementioned, the potentiometer wiper arm 14 is connected to the positive input terminal of the amplifier A38 whereby only the resulting potentiometer signal Vp representing the upward movement of the ram 4, as viewed in FIGS. 1 and 4, is utilized and will provide a signal output of amplifier A38. As will be recalled, when the ram 4 is moving upward, as viewed in FIG. 1, it is forcing fluid wax into the mold cavity C during the instant investment casting cycle.

The signal output of amplifier A40 is applied by conductor 118 to the negative input terminal of amplifier A42 which, in its present configuration, is acting as a voltage summing amplifier.

Amplifier A42 compares the signal Vm representative of the upward movement (velocity) of the ram 4 during the molding cycle with a velocity reference voltage Vc derived from amplifier A52.

The velocity clamp voltage Vv is derived in a similar manner to the aforementioned pressure clamp voltage Vp except that it is of opposite polarity; it is negative. The desired velocity reference voltage Vc is derived from amplifier A52 and is allowed to vary as commanded by said amplifier A52 until such time that it attempts to become more negative than the velocity clamp voltage Vv at R40. The diode D5 then conducts and clamps the voltage Vc at the value set by the wiper of R40. This prevents the velocity from exceeding the maximum value set by R40.

As aforementioned, velocity of the ram 4 is the rate of change of its position with respect to time.

Likewise, as will be understood, the acceleration of the ram 4 is defined as the rate of change of its velocity with respect to time.

The ram velocity is controlled during the injection cycle by means of clamping the Velocity Reference Voltage Vc. Velocity Clamp (Vv) is arbitrarily set by the operator by adjusting potentiometer R40, FIG. 4. Potentiometer R40 is connected across a precise −15 volt D.C. source and system ground. The operator presets this potentiometer to provide a certain value of negative D. C. voltage which provides a suitable quality of wax casting of the particular part being molded. For any particular part to be molded, several castings are usually made at various ram velocities, accelerations and wax pressures to determine the proper magnitudes of said parameters in order to cast a satisfactory part.

This preset negative D. C. voltage from potentiometer R40 is connected via its wiper arm 122 and conductor 123 to the positive input terminal of a conventional non-inverting operational amplifier A44.

The amplifier output of said amplifier A44 ($V_v$) is also a negative D. C. voltage which is connected through FET switch identified as (FET 1), diode D5 and conductor 125 to the aforementioned junction point J2.

The gate electrode of the FET switch (FET 1) is connected via conductor 128 to a +15 volt D. C. source and to terminal $\overline{CYC\ ON}$, the latter connecting with output terminal $\overline{CYC\ ON}$ (line 21A) FIG. 5, in the logic control circuit.

It will be recalled that upon initiation of the CYCLE ON signal of the TIMER (line 24) FIG. 5, the output signal level on conductor 70 is at logic (1) level.

As seen in FIG. 5 (line 21A) conductor 70 also connects to the input of inverter amplifier A48 resulting in the output signal level of said amplifier going to its logic (0) during the time period of the CYCLE ON signal output of the TIMER.

This logic (0) signal is applied by conductor 128, through diode D6 to the gate of the FET 1 switch to turn on said switch and thus enable the Velocity Clamp Voltage (Vv) output of the amplifier A44 to be connected by conductor 125 to junction point J2.

As seen in FIG. 4, a potentiometer R45 is connected across a precise +15 volt D. C. source and system ground. The wiper arm of said potentiometer is connected to the positive input terminal of a non-inverting amplifier A50 to thus provide a +D. C. voltage output therefrom which is connected via FET switch (FET 2), blocking diode D4 and conductor 135 to junction point J3.

The gate of FET 2 switch is connected via diode D3 to the aforementioned conductor 128 and hence to the $\overline{CYC\ ON}$ input terminal. As a result, both FET switches (1 and 2) are simultaneously triggered "on" to enable the clamp voltages Vv and Va of amplifiers A44 and A50 respectively, to be applied to junction points J2 and J3.

An integrating amplifier A52 has its negative input terminal connected through resistor R50 to junction point J3 and the output of said amplifier is connected through resistor R51 to junction point J2, thus connecting the input of said amplifier to the acceleration voltage Va and the output thereof to the voltage reference voltage Vc.

Capacitor C12 is connected across the input-output terminals of said amplifier A52 whereby said capacitor C12 and resistor R50 are connected as an RC time circuit across said amplifier. In the present embodiment the resistance value of R50 is 100Kohms and the value of capacitor C12 is 1 MFD. Operational Amplifier A56 has its output connected via resistor R52 to junction point J3. The positive input terminal of said amplifier A56 is connected in parallel to the source electrode of FET switch (FET 4) and to the wiper arm of potentiometer R60 which, in turn, is connected across a ±15 volt D. C. source.

As also shown, the output of amplifier A52 is fed back to the input (positive terminal) of amplifier A56 via resistor R65.

The gate of FET 4 switch is connected via diode D7 and conductor 137 in parallel with a +15 volt D. C. source and inut terminal $\overline{EXT\ INJ}$ which, in turn, is connected to the same terminal $\overline{EXT\ INJ}$ (line 15) FIG. 5, in the logic control circuit.

The drain electrode of FET 4 switch is connected to a +15 volt D. C. source.

The source electrode of said FET 4 switch is also connected in parallel with the source electrode of a second FET switcch identified as FET 3. The drain electrode of FET 3 switch is connected to a −15 volt D. C. source, and the gate electrode of said FET 3 switch is connected in parallel with a +15 volt D. C. source and input terminal $\overline{RET\ INJ}$ which also connects with the same identified output terminal of the logic control circuit of FIG. 5 as shown in line 9, thereof.

Figure 3A:
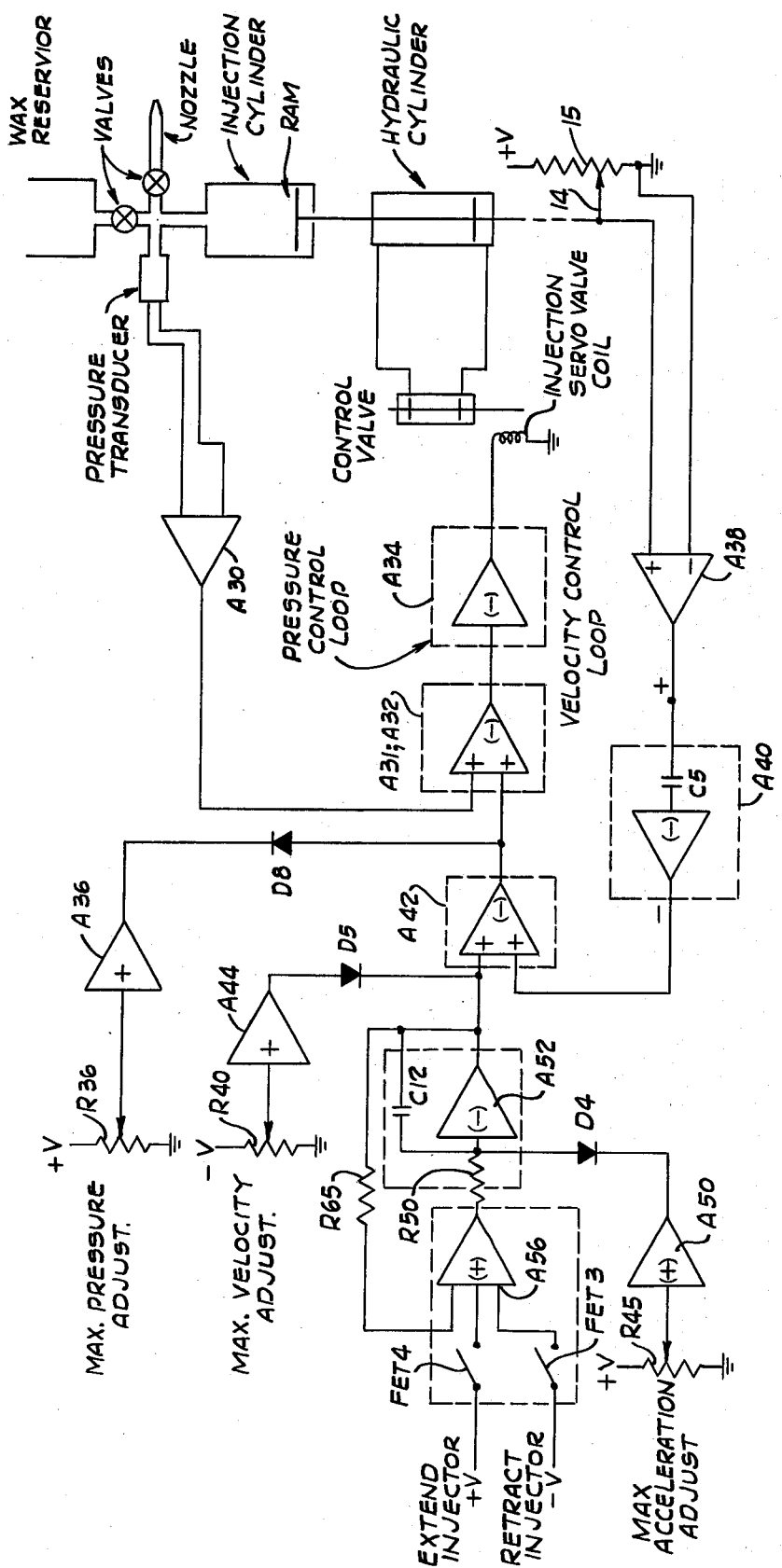
FIG. 3A is a schematic diagram of the servo-control incorporated in the present invention.
Figure 3B:
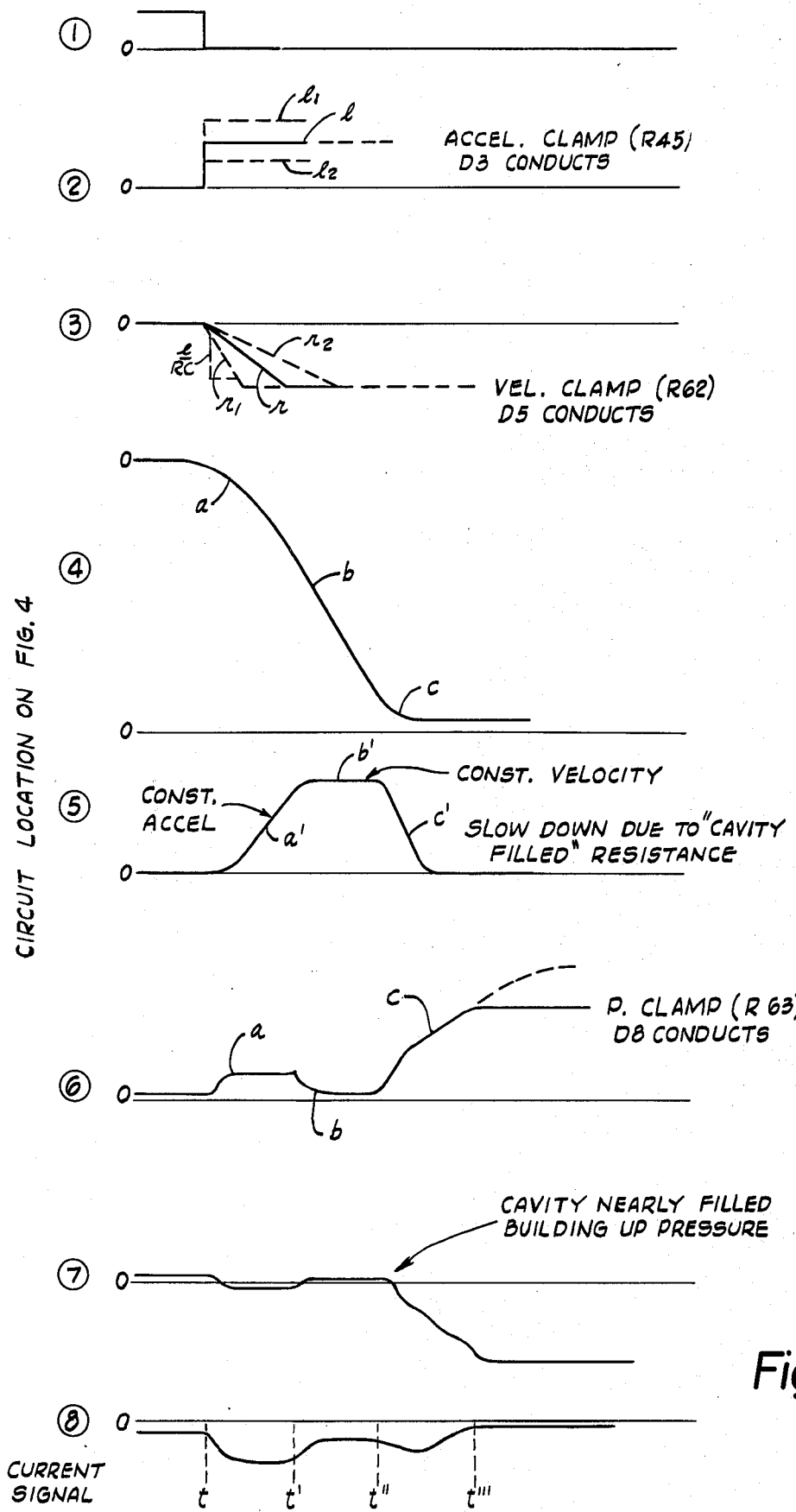
FIG. 3B is a chart showing typical voltage waveforms which occur at the positions (1-8) as noted in FIG. 4 in the servo-control.

With reference directed to FIGS. 3A, 3B and 4, the servo-control operates as follows.

The operator arbitrarily selects a setting for the Acceleration Reference Voltage (R45), the Velocity Reference Voltage (R40) and the Pressure Reference Voltage (R36).

With the molding machine in its static or at rest condition the positive input terminal of amplifier A56 is at substantially its zero voltage level (Average). Likewise, the diode D8 in the Pressure Clamp Voltage circuit is nonconducting.

The pressure transducer T is in balance and the movable wiper 14 of the linear potentiometer 15 is at rest at some position between system ground and its +10 volts D. C. level.

Likewise, there is no current flowing in the injection servovalve coil, and the spool valve 35 is in its FIG. 1 position.

Upon receipt of the $\overline{EXT\ INJ}$ signal (logic 0), FIG. 4, position 1, the source to gate voltge of said FET 4 switch is less than the pinch off voltage of FET 4, and said FET 4 switch hence turns on. This signal waveform is illustrated at position 1 in FIG. 3B. When FET 4 switch turns on, amplifier A56 attempts to go toward positive saturation. However, the $\overline{CYC\ ON}$ signal, (logic 0) level is applied to the diode D3 at the same time as the signal $\overline{EXT\ INJ}$ is applied to diode D7, and is operable to turn on FET 2 switch and connect the (+) Acceleration Reference Voltage to the cathode of diode D4. When the voltage signal output of amplifier A56 (junction J3) reaches the same (+) voltage level as set by potentiometer R45, this output signal is applied via conductor 135 to the anode of diode D4 whereby said diode conducts to clamp junction J3 to this preset level (R45).

The output voltage level of amplifier A56 is thereby clamped to this voltage reference level of junction J3. The waveform of this clamp signal at junction J3 is illustrated at position 2 in FIG. 3B.

As also illustrated at position 2 in FIG. 3B, the level of this Acceleration Clamp Voltage, may, as aforementioned, be arbitrarily set by (R45) at any value between system ground and +15 volts D. C.; several additional examples of such levels being depicted at $l_1$ and $l_2$.

This output signal (+) of amplifier A56 is applied to the negative input terminal of integrator amplifier A52 to thus generate a linear negative going ramp signal, the waveform of which is depicted at position 3, FIG. 3B.

When the signal $\overline{CYC\ ON}$ (logic 0) is applied to the input (diode D3) to the servo-control, it is also applied via diode D6 to the FET 1 switch thereby turning on said switch and connecting the Velocity Clamp Voltage through amplifier A44 to the anode of diode D5. This negative going ramp voltage waveform r is also at junction J2 and is applied via conductor 125 to the cathode of diode D5.

And, when this ramp voltage r reaches the voltage level set by potentiometer R40, diode D5 conducts and clamps said junction J2 to this negative voltage level (R40).

The slope of this ramp output signal from amplifier A52 is defined by the equation e/RC where e is the input signal to said amplifier A52 at junction J3. And, as already indicated the input signal to amplifier A52 is shown at position 2 FIG. 3B which may have various preselected levels, i.e., 1, $1_1$, $1_2$, etc.

When input signal (level 1) is applied to amplifier A52, it will generate the ramp voltage depicted at r in position 3, FIG. 3B whereas input signal level $l_1$ or $l_2$ will generate the ramp voltage $r_1$ or $r_2$, respectively.

As will be seen, the time for ramp voltage $r_1$ to reach the clamp level of the Velocity Reference Voltage at junction J2 is less than that for ramp voltage r, and in like comparison, the time period for ramp voltage $r_2$ is longer than for ramp voltage r.

As this ramp voltage "r" is initiated, it is applied to the negative input terminal of Summing Amplifier A42 thus generating a positive going signal output the waveform of which is depicted at position 6 in FIG. 3B.

This voltage waveform is then applied via voltage inverter amplifiers A31, A32, current amplifier A34 and conductor 106 to the injection servovalve coil whereby sufficient current flows through said coil to actuate the spool valve 35 and cause the movement of the ram 4 upward as viewed in FIG. 1 to force the liquid wax into the mold cavity C.

As ram 4 thus begins to move in its wax injection direction, the wiper arm 14 of the linear potentiometer 15 moves toward the grounded end of the potentiometer resistance element and results in the generation of a voltage signal waveform as shown as position 4 in FIG. 3B. As seen, this waveform is initially non-linear (part a) of the injection cycle, to thus indicate that the ram velocity is initially increasing (accelerating), and thereafter the waveform becomes linear and negative going, as depicted in part b, thus indicating that the ram velocity has become constant.

And, at the end of the injection cycle this voltage waveform (part c) becomes non-linear and approaches zero slope to thus indicate that the ram velocity is decreasing (decelerating) and finally stops.

The voltage waveform (position 4) is applied to unity gain amplifier A38 FIG. 4 and thence the output thereof is applied to differentiator amplifier A40.

The output signal waveform provided by amplifier A40 is shown at position 5 in FIG. 4B wherein the portion a' represents a substantially constant acceleration of the ram 4 and corresponds to portion a of waveform (position 4) input to amplifier A38.

Likewise, waveform portion b' represents the part of the injection cycle where the ram velocity is substantially constant, thus also corresponding to waveform portion b position 4 FIG. 3B; and similarly waveform portion c' (position 5) represents the end of the injection cycle when the ram begins to slow down and finally stops thereby corresponding to waveform portion c (position 4) FIG. 3B.

As previously mentioned, the servo-control of the present invention is intended to continuously monitor the velocity and acceleration parameters which the ram undergoes during the wax injection cycle and to compare said parameters with preselected parameters which represent what the operator determines to be the desired velocity and acceleration parameters and to then adjustably regulate the actuation of the ram in response to said comparison to thereby provide for the molding of the highest quality of casting.

To accomplish this, the voltage signal output $V_m$ from the differentiator amplifier A40 is applied via conductor 118 FIG. 4 to the negative input terminal of summing amplifier A42 whereat it is in parallel with the voltage signal $V_c$ at junction J2. Algebraically this summation is represented by the equation $(V_c - V_m)$, or graphically it is represented by the waveform which appears on the output of amplifier A42, the configuration of which is shown at position 6, FIG. 3B.

As noted, this voltage waveform, position 6, FIG. 3B is very close to zero magnitude being just slightly above the zero reference and is substantially constant excepting for an instant at the beginning of the wax injection cycle as indicated at "a", and at the point "b" where ram velocity becomes constant, and subsequently at point "c" near the end of the injection cycle where ram velocity slows down and ultimately stops.

At the instant of point "a" the voltage signal rises abruptly which is the result of the associated circuitry adjustment in going from a quiescent mode to an active conductive mode. Likewise, point "b" indicates the circuit response to and is representative of the ram velocity becoming constant as well as being responsive to the instant the clamping voltage (R40) is applied to junction J2.

At the time interval illustrated as "c", in the wax injection cycle, the mold cavity begins to fill with wax sufficient to create a wax pressure which resists movement of the ram.

As the ram begins to slow down the voltage signal output of the summing amplifier A42—portion c—beings to ramp upward in a positive direction (in an attempt to restore the commanded velocity) until it reaches the + pressure reference voltage level preset by the potentiometer R36.

As seen in FIG. 4 the aforementioned pressure reference voltage $V_p$ circuit, potentiometer R36, and amplifier A36 is connected via conductor 109 to junction J1.

The potentiometer R36 is preset by the operator at some + voltage value between system ground and +15 volts D. C. This voltage is applied to the input of its associated unity gain amplifier A36 whereby said amplifier is turned on. The output of said amplifier is connected to the cathode of clamping diode D8.

The anode of said diode is connected to said conductor 109 and hence to the voltage output signal from amplifier A42.

In operation, during the time interval $t - t''$, as shown in FIG. 3B, the voltage output signal of the amplifier A42, position 6, is less positive than the voltage level $V_p$ set by the potentiometer R36, and consequently diode D8 remains nonconductive.

At time interval $t'''$, FIG. 3B the voltage output signal of summing amplifier A42 rises to a positive magnitude sufficiently to make the anode of diode D8 sufficiently positive with respect to its cathode causing said diode D8 to conduct and to thereby clamp junction J1 to the magnitude of voltage $V_p$ set by potentiometer R36.

During a typical wax injection cycle, such as is represented by the time period $(t - t''')$ FIG. 3B, wax is forced into the mold cavity C by the ram moving in its wax injection stroke or upwards as viewed in FIG. 1.

At sometime in this cycle, such as represented beginning at time $t''$, FIG. 3B, the wax deposited in said cavity builds up sufficient pressure so as to begin to resist the ram movement, and as more wax is deposited in the mold cavity C this wax pressure progressively increases.

This pressure increase causes the pressure transducer T FIG. 4 to be correspondingly responsive to produce a voltage signal, the typical configuration of which is shown at position 7, FIG. 3B.

As previously mentioned, the pressure transducer T is mounted in the housing 48 and is in communication with the channel 6, FIG. 2. In its electrical configuration said transducer comprises a resistance bridge circuit FIG. 4 connected across a precise +10 volt D.C. source and system ground. The output of the bridge is connected by conductors 100 and 101 across the input of inverting amplifier A30.

During the wax injection cycle, this voltage signal from transducer T (position 7, FIG. 3B) and the voltage output signal from summing amplifier A42 (position 6, FIG. 3B) are applied to the input of a second summing amplifier A31 and thence to amplifier A32 and current amplifier A34 whereat a current signal is produced thereby, the typical desirable waveform of which is shown at position 8, FIG. 3B, and which is representative of the velocity and acceleration clamping signals (R40 and R45), the voltage signal from the linear potentiometer 15, the pressure reference voltage signal (R36) and the voltage signal from transducer T.

As shown, this current signal is slightly negative throughout the greater part of the time period as represented by the period $t-t''$, FIG. 3B in the wax injection cycle.

Near the end of this injection cycle, i.e., beginning at approximately time $t''$, the pressure voltage signal from transducer T (position 7, FIG. 3B) provides a slight increase in current output from current amplifier A34.

This current output signal from amplifier A34 is applied via conductor 106 to the injection servovalve coil and is sufficient to maintain the spool valve 35 in its actuated condition such as to continue to urge the ram 4 upward as viewed in FIG. 1 and maintain a suitable pressure on the wax in the mold cavity C.

With the servo-control thus described, it will be realized that the system pressure cannot exceed a level which is greater than what the pressure reference R36 is limited to. Therefore, a continuously variable, manual limit is formed on the pressure reference signal by R36 and its associated circuitry to control maximum pressure.

The resistors R57 and R58 are sized to scale the voltage from the "pressure control" potentiometer R36 down so that the amplifier A36 will not be required to exceed its maximum output capability of 10 to 13 volts.

A positive pressure reference voltage is required when the system is in the injection cycle, ram going up and forcing wax into the mold cavity C. A negative pressure reference voltage is required when the system is taking on wax. Pressure control is only required during the injection cycle.

This system allows a complete pressure adjustment range from 0 to 1000 PSI on the injection cycle.

As also understood, the amplifier A42 is constructed as an integrating amplifier so as to insure that whatever velocity signal $V_c$ is used as a reference the wax pressure will obtain its set pressure as soon as the mold cavity is filled. This is necessary in the case where a small velocity is being commanded. The pressure reference at junction J1 will be adjusted by way of the velocity feedback. That is, if the velocity error voltage $(V_c - V_m)$ tends to increase, this causes an increased pressure in the injection system and consequently an increase in ram velocity. This is fed back as measured velocity $V_m$ to decrease the error signal. However, when the ram ceases to move because of pressure buildup in the cavity, the velocity feedback signal ceases and the integrating amplifier's output will increase until it reaches the controlled pressure limit.

With the present servo-control, it will now be realized that the ram velocity (or wax flow rate) is controlled by means of the velocity clamp voltage. In actual practice, the velocity loop of the present servo-control is designed such that a fixed zero (0) to ten (10) volt input signal will proportionately control a zero (0) to 0.61 in/sec ram velocity (5 gal/min wax flow).

As will now also be apparent, ram acceleration and velocity are controlled by limiting respectively the voltage input to amplifier A52, i.e. to control acceleration by clamp R45, and the voltage output of said amplifier, i.e., to control velocity by clamp R40. Because of the very high gain of amplifier A56, the feedback resistor R56 provides negative feedback such that the output of said amplifier A56 will switch back and forth from plus saturation voltage (+10 to +13 volts) to minus saturation voltage (−10 to −13 volts) at rate which will cause the current in R65A to equal the current in R 65. Therefore, when the input to amplifier A56 is made to equal zero, the voltage output of amplifier A52 will maintain an average zero output and all system motion will stop.

The additional components R63 and R64 are used to add a hysteresis characteristic as will be understood to assure the circuit stability.

The resistor R65 and the potentiometer R60 of amplifier A56 are used to null the system to the point that no motion occurs when no input is present. This adjustment is intended to compensate for all the electronic system imbalances of the servocontrol.

When the timer T times out to terminate the wax injection cycle, its output logic (1) signal on conductor 70 reverts to its logic (0) level. When this occurs, this logic (0) signal is applied via C1 Valv terminal (line 23, FIG. 5) which is then applied via the Close Valve input terminal (line 3, FIG. 6) of the solenoid control circuit effective to deenergize solenoid coil D. As a result, the hydraulic motor operable with solenoid D, FIG. 8, is actuated by its hydraulic control circuit to slide the valve 7 to the left to the position as viewed in FIG. 3 to bring valve part 7A across wax passage 6, thus connecting the wax reservoir 1 to the injection chamber 3.

As previously indicated herein, the current signal (position 7, FIG. 3B) of the amplifier A34 of the servocontrol is then effective to cause the ram 4 to move upward in its injection stroke, as viewed in FIG. 1, to substantially zero volume in chamber 3 and thus effective after having completely filled the mold cavity C to return the wax then remaining in the wax chamber 3 and passage 6 to the reservoir 1.

Referring to FIG. 5, line 16, OR-30 gate connected in series with AND-40 gate, the output of the latter connecting to one input of OR-25 gate.

This circuit assures that at the end of the injection cycle in automatic mode the upward movement of the ram 4 will be maintained so as to empty the wax chamber 3 of any wax then remaining therein and back into the reservoir 1.

To accomplish this, one input to OR-30 gate (line 16) is connected to the Raise Platen output terminal (line 21). The output of said OR-30 gate is connected to one input of AND-40 gate. The remaining input is connected by conductor 112 to the output of inverter amplifier A18; the input of which is connected to the INJ EXT output terminal (line 10).

The output of AND-40 gate, line 16, is connected by conductor 104 back to the input of OR-30 gate and also to one input of OR-25 gate, the output of which is connected to one input of OR-12 gate.

In operation, at the end of the injection molding cycle in automatic mode, a logic (1) signal is applied to the Raise Platen input to OR-30 gate producing a logic (1) signal output which is then applied to one input of AND-40 gate.

The other input of AND-40 gate is also logic (1) by reason that the INJ EXT input of inverter A18 is then logic (0) level which, as inverted becomes logic (1) and applied by conductor 112 to said AND-40 gate input.

The output of AND-40 gate is then logic (1) which is applied to OR-25 gate and then to OR-12 gate effective to produce a logic (1) signal at the input of inverter amplifier A9 (line 14) which then provides a logic (0) signal output on output terminal $\overline{EXT\ INJ}$ which, in turn, maintains the FET 4 switch of the servo-control, FIG.

4, in its closed condition, As a result, the upward movement of the ram 4 is retained to empty the chamber 3 of any residue wax therein and to return the same to the reservoir 1.

The ram movement continues until the comparator A11 (line 10) balances out to provide a logic (1) output signal on terminal INJ EXT (line 10) at which time the upward movement of ram 4 is stopped.

As previously mentioned, the logic circuit, FIG. 5, is programmable to provide a preselected volume of fluid wax to be drawn into the wax chamber 3 by the downward retraction of the ram 4 which assures that sufficient wax will be available to mold a satisfactory part on the next cycle.

To accomplish this, the logic-control of the present invention includes a Shot-Size—Linear Potentiometer Comparator Circuit (lines 9 and 10, FIG. 5), which is programmed by the operator.

A potentiometer R100, line 9 is connected across a +10 volt D.C. source and system ground and has its wiper arm 101 connected to the negative input terminal of an operational amplifier A100 of conventional configuration and functioning as a comparator in its associated circuit.

The wiper arm 16 of the linear potentiometer 15 attached to the ram shaft 13A and is connected by conductor 103 to the positive input terminal by feedback resistor R105.

The output of amplifier A100 is connected to the input of an inverter-amplifier A108, the output of which is connected in tandem to the input of another inverter-amplifier A109. The output of said amplifier A109 is connected to the input of the aforementioned inverter-amplifier A62.

Initially the operator adjusts the wiper arm 101 of potentiometer R100 to provide a value of positive D.C. voltage which is preselected to be representative of what is believed to be the required volume of wax which will be sufficient to CAST the intended part. As aforementioned, the setting of potentiometer R100 is made to provide a somewhat larger quantity of wax than is anticipated will be actually required to fill the mold cavity C.

With the ram 4 in its uppermost position as viewed in FIG. 1, whereby substantially no wax is in chamber 3, the wiper arm 16 of the potentiometer is at ground level or zero volts.

Consequently, the two input signals to the comparator amplifier A100 represent the voltage difference between the settings of potentiometer R100 and potentiometer 15.

Then, as the ram 4 is retracted (downwardly as viewed in FIG. 1) it draws wax into chamber 3.

Also, the wiper arm 16 of the linear potentiometer 15 moves toward the +10 volt end of the potentiometer resistance, and consequently the "voltage difference" between the setting of potentiometer R100 and said linear potentiometer 15 decreases.

When this "voltage difference" decreases to the threshold of the comparator amplifier A100 the output level of said amplifier goes to its high state. Then sequentially, this causes the output signal of inverter-amplifier A108 to go to its logic (0) level; the output signal of inverter-amplifier A109 to go to its logic (1) level; the output signal of inverter-amplifier A62 to go to its logic (0) level; the output signal of AND 9 gate to go to its logic (0) level; the output signal of AND 8 gate to go to its logic (0) level, and the output signal of inverter-amplifier A61 to go to its logic (1) level.

This logic (1) signal is applied to output terminal $\overline{RET\ INJ}$ which is connected to input terminal $\overline{RET\ INJ}$ of the servo-control and turns off the FET 3 switch stopping the retraction movement of the ram.

As will now be understood, the quantity of fluid wax drawn into the chamber 3 in the retraction mode of the ram 4 is thus dependent upon and determined by the "voltage difference" programmed by the operator in his initial setting of the Shot Size Potentiometer R100.

The instant logic control, FIG. 5 is also manually programmable to enable the clamping platen end nozzle movement to be operated independently for purposes of setting up or positioning the mold in preparation for the automatic molding sequence previously described.

To accomplish this, the manual pushbutton (line 4, FIG. 5) may be pushed and latched in its closed position thus placing a logic (1) signal on the input of inverter-amplifier A2 which results in a logic (0) signal output therefrom which is then applied to one input of AND-2 gate.

The other input to said AND-2 gate is also logic (1) inasmuch as the "pump on" pushbutton (line 2) has been momentarily in its closed position so that the hydraulic system is energized prior to the start of the wax injection mode.

The output signal of AND-2 gate is hence logic (1) level and is applied to one input of AND-3 gate. The other input to AND-3 gate is logic (0) inasmuch as the AUTO pushbutton is in its open position.

The signal output of AND-3 gate is hence logic (0) which is applied to the input of inverter-amplifier A72 thereby providing a logic (1) signal to output terminal MANUAL (line 3) FIG. 5.

Next, the #1 and #2 clamp pushbuttons (lines 6 and 7) FIG. 5 are held closed by the operator, as in the automatic mode, to thereby lower the platen 22 into clamping position with the mold M.

If the positioning of the mold M and nozzle engagement is satisfactory, an automatic cycle may then be programmed as previously described.

The logic circuit, FIG. 5, is also provided with a cycle stop safety circuit (line 25) which enables the operator to immediately stop the molding operation at any time during its automatic mode of operation.

This is accomplished in the following control sequence.

The TIMER configuration is such that if a logic (0) signal is applied through conductor 200 to its input (pin 4) during the injection cycle the TIMER is immediately disabled and stops the molding operation.

To accomplish this, the normally-closed Cycle Stop pushbutton (line 25) is connected to one input of AND-42, the remaining input to said gate being connected to the AUTO terminal (line 4).

Assuming that the apparatus is in its "AUTO" mode of operation, a logic (1) signal is thus applied to both inputs to AND-42 gate.

The output signal of AND-42 gate is thence at its logic (1) level and is applied to one input of AND-43 gate, the remaining input being the logic (1) signal output from inverter-amplifier A70.

The output signal level of AND-43 gate is hence logic (1) which is applied to the input (pin 4) of the TIMER and enables said TIMER to continue in its normal control function.

Should the operator see that the apparatus is malfunctioning, as for example that the mold M is misaligned whereby fluid wax is being ejected onto the floor or onto the apparatus, he may momentarily depress the Cycle Stop pushbutton (line 25) placing a logic (0) signal on the input of AND-42 gate which is effective to drive the output of AND-43 gate to its logic (0) level which logic (0) signal is then applied to the input (pin 4) of TIMER which is effective to disable the same as stop the molding operation.

This circuit also functions to stop the apparatus if the ram 4 has been fully extended so as to expel all wax from chamber 3 while at the same time the TIMER is still in its wax injection mode calling for more wax.

This condition may arise when the Shot Size—Linear Potentiometer Circuit (lines 9 and 10) FIG. 5 has been preset (adjustment of R100) to provide less wax then actually required to fill the mold cavity C.

Should this condition arise, the arm 4 moves to its upper position as viewed in FIG. 1 whereby a logic (1) signal is applied to the INJ EXT input to AND-45 gate. A logic (1) signal is also being applied to the CYC ON input of said AND-45 gate by reason that the TIMER (line 24) is still in its wax injection mode of operation.

The output signal of said AND-45 gate is hence logic (1) which is applied to the input of inverter-amplifier A70 to provide an output therefrom of logic (0) level.

This logic (0) signal is applied to one input of AND-43 gate which results in the output signal level of said gate AND-43 going to logic (0) which, in turn, is applied to the input (pin 4) of said TIMER thus disabling the same and stopping the molding operation.

Having thus described in detail the structure and operation of the present molding apparatus it is now realized that the new and novel injection molding apparatus is operable to accurately control the parameters of the pattern molding process, specifically the dynamics of fluid wax flow, i.e. wax velocity and acceleration, and wax pressure so as to provide a high quality of wax pattern.

The following list of components and their respective electrical value represent a typical embodiment of apparatus of the present invention which has been constructed and satisfactorily operated as described herein.

| Components Listed in FIG. 4 | |
| --- | --- |
| A40 | NATIONAL SEMI OP AMP #LF357H |
| A38 | NATIONAL SEMI INSTR. #LH0036CG |
| A30 | NATIONAL SEMI INSTR. #LH0036CG |
| A42 | NATIONAL SEMI OP AMP #LF355H |
| A31 | NATIONAL SEMI OP AMP #LF355H |
| A32 | NATIONAL SEMI OP AMP #LF355H |
| A34 | NATIONAL SEMI OP AMP #LF355H |
| A36 | NATIONAL SEMI OP AMP #LF355H |
| A | NATIONAL SEMI OP AMP #LF355H |
| A56 | NATIONAL SEMI OP AMP #LF355H |
| A52 | NATIONAL SEMI OP AMP #LF355H |
| A50 | NATIONAL SEMI OP AMP #LF355H |
| A44 | NATIONAL SEMI OP AMP #LF355H |
| T | NATIONAL SEMI TRANSISTOR #NSD 153 |
| FET 3 | NATIONAL SEMI FET #P1087E |
| FET 4 | NATIONAL SEMI FET #P1087E |
| FET 2 | NATIONAL SEMI FET #P1087E |
| FET 1 | NATIONAL SEMI FET #P1087E |
| D8 | NATIONAL SEMI DIODE #IN4154 |

-continued

| Components Listed in FIG. 4 | |
| --- | --- |
| D7 | NATIONAL SEMI DIODE #IN4154 |
| D3 | NATIONAL SEMI DIODE #IN4154 |
| D4 | NATIONAL SEMI DIODE #IN4154 |
| D5 | NATIONAL SEMI DIODE #IN4154 |
| D6 | NATIONAL SEMI DIODE #IN4154 |
| C18 | CAPACITOR CDE .1 MFD #WMF05P1 |
| C19 | CAPACITOR CDE .1 MFD #WMF05P1 |
| C20 | CAPACITOR CDE .1 MFD #WMF05P1 |
| C17 | CAPACITOR CENTRA LAB 330 PFD #165-DD331 |
| C15 | CAPACITOR SPRAGUE 8.2 MFD #150D 15VDC 0825X |
| C17 | CAPACITOR CDE .1 MFD #WMF05P1 |
| C21 | CAPACITOR CDE .1 MFD #WMF05P1 |
| C18 | CAPACITOR CDE .1 MFD #WMF05P1 |
| C16 | CAPACITOR ELECTROCUBE 3 MFD #210B1B305K |
| C22 | CAPACITOR CDE 1MFD #WMF05W1 |
| C23 | CAPACITOR CDE .1MFD #WMF05P1 |
| C12 | CAPACITOR CDE 1MFD #WMF05W1 |
| C15 | CAPACITOR CENTRA LAB 330 PFD #165-DD331 |
| C13 | CAPACITOR CENTRA LAB 330 PFD #165-DD331 |
| C14 | CAPACITOR CENTRA LAB 330 PFD #165-DD331 |
| R91 | BOURNS TRIMPOT 50K 3069P-1-503 |
| R92 | METAL FILM RESISTOR 71.5K 1/8W 1% |
| R93 | BOURNS TRIMPOT 500Ω #3069P-1-100 |
| R69 | METAL FILM RESISTOR 100Ω 1/8W 1% |
| R72 | METAL FILM RESISTOR 40.2Ω |
| R68 | METAL FILM RESISTOR 1MΩ |
| R71 | METAL FILM RESISTOR 100Ω |
| R70 | METAL FILM RESISTOR 220KΩ |
| R67 | METAL FILM RESISTOR 200KΩ |
| R73 | METAL FILM RESISTOR 100Ω |
| R74 | METAL FILM RESISTOR 100Ω |
| R63 | METAL FILM RESISTOR 4.02KΩ |
| R61 | METAL FILM RESISTOR 200KΩ |
| R31 | METAL FILM RESISTOR 10KΩ |
| R37 | METAL FILM RESISTOR 10KΩ |
| R75 | METAL FILM RESISTOR 49.9KΩ |
| R66 | METAL FILM RESISTOR 50KΩ |
| R76 | METAL FILM RESISTOR 100KΩ |
| R78 | METAL FILM RESISTOR 100KΩ |
| R77 | METAL FILM RESISTOR 100KΩ |
| R88 | METAL FILM RESISTOR 1.62KΩ |
| R89 | METAL FILM RESISTOR 604Ω 1/8W 1% |
| R87 | METAL FILM RESISTOR 100KΩ |
| R86 | METAL FILM RESISTOR 1KΩ |
| R90 | METAL FILM RESISTOR 604Ω |
| R57 | METAL FILM RESISTOR 49.9KΩ |
| R58 | METAL FILM RESISTOR 100KΩ |
| R79 | METAL FILM RESISTOR 4.99KΩ |
| R80 | METAL FILM RESISTOR 10KΩ |
| R81 | METAL FILM RESISTOR 1MΩ |
| R82 | METAL FILM RESISTOR 10KΩ |
| R83 | METAL FILM RESISTOR 100Ω |
| R84 | METAL FILM RESISTOR 100Ω |
| R85 | METAL FILM RESISTOR 10KΩ |
| R60 | BOURNS TRIMPOT 10KΩ #3069P-1-103 |
| R65A | METAL FILM RESISTOR 100KΩ 1/8W 1% |
| R63 | METAL FILM RESISTOR 1KΩ |
| R44 | METAL FILM RESISTOR 15KΩ |
| R43 | METAL FILM RESISTOR 10KΩ |
| R48 | METAL FILM RESISTOR 4.99KΩ |
| R46 | METAL FILM RESISTOR 10KΩ 1/8W 1% |
| R47 | METAL FILM RESISTOR 10KΩ |
| R92 | METAL FILM RESISTOR 10KΩ |
| R53 | METAL FILM RESISTOR 140KΩ |
| R55 | METAL FILM RESISTOR 49.9KΩ |
| R54 | METAL FILM RESISTOR 10KΩ |
| R56 | METAL FILM RESISTOR 100KΩ |
| R64 | METAL FILM RESISTOR 1MΩ |
| R65 | METAL FILM RESISTOR 20KΩ |
| R52 | METAL FILM RESISTOR 10KΩ |
| R50 | METAL FILM RESISTOR 100KΩ |
| R59 | METAL FILM RESISTOR 10KΩ |
| R51 | METAL FILM RESISTOR 1KΩ |
| R64 | METAL FILM RESISTOR 1KΩ |

| Components Listed in FIG. 5 | | |
|---|---|---|
| AND 5,7,8,15 | NATIONAL SEMICONDUCTOR | MM74CO8N - AND GATE |
| OR 11,12,25,38 | NATIONAL SEMICONDUCTOR | MM74C32N - OR |
| A5,8,9,13,18 | NATIONAL SEMICONDUCTOR | MM74CO4N - INVERTER |
| AND 9,17,35,40 | NATIONAL SEMICONDUCTOR | MM74CO8N - AND GATE |
| A 11, 100 | NATIONAL SEMICONDUCTOR | LM2901N - COMPARATOR |
| AND 10,11,12,45 | NATIONAL SEMICONDUCTOR | MM74CO8N - AND GATE |
| A 1,2,3,72,48 | NATIONAL SEMICONDUCTOR | MM74CO4N - INVERTER |
| OR 1,2,3 | NATIONAL SEMICONDUCTOR | MM74C32N - OR GATE |
| AND 1,2,3,4 | NATIONAL SEMICONDUCTOR | MM74CO8N - AND GATE |
| OR 4,5,10,13 | NATIONAL SEMICONDUCTOR | MM74C32N - OR GATE |
| A 4,62,70,108,109 | NATIONAL SEMICONDUCTOR | MM74CO4N - INVERTER |
| AND 6,16,38,43 | NATIONAL SEMICONDUCTOR | MM74CO8N - AND GATE |
| TIMER | SIGNETICS | NE555 - TIMER |
| AND 42 | NATIONAL SEMICONDUCTOR | MM74CO8N - AND GATE |
| AND 14,18,19 | NATIONAL SEMICONDUCTOR | MM74CO8N - AND GATE |
| A 6,7,15,16,17 | NATIONAL SEMICONDUCTOR | MM74CO4N - INVERTER |
| AND 13,20,21,22 | NATIONAL SEMICONDUCTOR | MM74CO8N - AND GATE |
| C1 | CAPACITOR CDE .01 MFD | #WMFISI |
| C2 | CAPACITOR SPRAGUE 300 MFD | #TE-1165.5 15 v DC |
| R16 | METAL FILM RESISTOR | 10KΩ 1/8W 1% |
| R4 | METAL FILM RESISTOR | 10KΩ |
| R5 | METAL FILM RESISTOR | 10KΩ |
| R6 | METAL FILM RESISTOR | 10KΩ |
| R7 | METAL FILM RESISTOR | 10KΩ |
| R8 | METAL FILM RESISTOR | 10KΩ |
| R9 | METAL FILM RESISTOR | 10KΩ |
| R10 | METAL FILM RESISTOR | 10KΩ |
| R17 | METAL FILM RESISTOR | 10KΩ |
| R18 | METAL FILM RESISTOR | 10KΩ |
| R19 | METAL FILM RESISTOR | 10KΩ |
| R20 | METAL FILM RESISTOR | 10KΩ |
| R21 | METAL FILM RESISTOR | 10KΩ |
| R22 | METAL FILM RESISTOR | 10KΩ |
| R23 | METAL FILM RESISTOR | 10KΩ |
| R3 | BOURNS TRIMPOT 50KΩ #3069P-1-503 | |
| R12 | METAL FILM RESISTOR | 3K Ω 1/8W 1% |
| R15 | METAL FILM RESISTOR | 3KΩ 1/8W 1% |
| R105 | METAL FILM RESISTOR | 500KΩ |
| R14 | METAL FILM RESISTOR | 500KΩ |
| R13 | METAL FILM RESISTOR | 10KΩ |
| R11 | METAL FILM RESISTOR | 10KΩ |
| R2 | BOURNS TRIMPOT 50KΩ #3069P-1-503 | |
| R1 | METAL FILM RESISTOR | 10MΩ 1/8W 1% |
| R24 | METAL FILM RESISTOR | 10KΩ |

| Components Listed in FIG. 6 | | | | |
|---|---|---|---|---|
| 6360-2 | PC BOARD | | | |
| CR6 | SOLID STATE CLARE RELAY 203A05A2A | | | |
| CR5 | SOLID STATE CLARE RELAY 203A05A2A | | | |
| CR1 | SOLID STATE CLARE RELAY 203A05A2A | | | |
| CR2 | SOLID STATE CLARE RELAY 203A05A2A | | | |
| CR4 | SOLID STATE CLARE RELAY 203A05A2A | | | |
| CR3 | SOLID STATE CLARE RELAY 203A05A2A | | | |
| C10 | CAPACITOR SPRAGUE 5GA-P10 .1MFD 500V | | | |
| C9 | CAPACITOR SPRAGUE 5GA-P10 .1MFD 500V | | | |
| C8 | CAPACITOR SPRAGUE 5GA-P10 .1MFD 500V | | | |
| C7 | CAPACITOR SPRAGUE 5GA-P10 .1MFD 500V | | | |
| C6 | CAPACITOR SPRAGUE 5GA-P10 .1MFD 500V | | | |
| C5 | CAPACITOR SPRAGUE 5GA-P10 .1MFD 500V | | | |
| T6 | TRANSISTOR NSD 153 | | | |
| T5 | TRANSISTOR NSD 153 | | | |
| T1 | TRANSISTOR NSD 153 | | | |
| T2 | TRANSISTOR NSD 153 | | | |
| T4 | TRANSISTOR NSD 153 | | | |
| T3 | TRANSISTOR NSD 153 | | | |
| R36' | METAL FILM RESISTOR | 22KΩ | 1/8W | 1% |
| R34 | METAL FILM RESISTOR | 22KΩ | 1/8W | 1% |
| R31' | METAL FILM RESISTOR | 22KΩ | 1/8W | 1% |
| R30 | METAL FILM RESISTOR | 22KΩ | 1/8W | 1% |
| R28 | METAL FILM RESISTOR | 22KΩ | 1/8W | 1% |
| R26 | METAL FILM RESISTOR | 22KΩ | 1/8W | 1% |
| R35 | METAL FILM RESISTOR | 4.99KΩ | 1/8W | 1% |
| R33 | METAL FILM RESISTOR | 4.99KΩ | 1/8W | 1% |
| R32 | METAL FILM RESISTOR | 4.99KΩ | 1/8W | 1% |
| R29 | METAL FILM RESISTOR | 4.99KΩ | 1/8W | 1% |
| R27 | METAL FILM RESISTOR | 4.99KΩ | 1/8W | 1% |
| R25 | METAL FILM RESISTOR | 4.99KΩ | 1/8W | 1% |

-continued

| Components Listed in FIG. 6 | | | | |
|---|---|---|---|---|
| R42 | OHMITE CARBON RESISTOR | 22Ω | 1W | 5% |
| R41 | OHMITE CARBON RESISTOR | 22Ω | 1W | 5% |
| R40 | OHMITE CARBON RESISTOR | 22Ω | 1W | 5% |
| R39 | OHMITE CARBON RESISTOR | 22Ω | 1W | 5% |
| R38 | OHMITE CARBON RESISTOR | 22Ω | 1W | 5% |
| R37' | OHMITE CARBON RESISTOR | 22Ω | 1W | 5% |

What is claimed is:

1. In combination, an investment pattern molding machine having a source of fluid molding material and a movable ram and a mold into which said material is to be forced under pressure by means of said movable ram moving through a predetermined distance in a fluid injection direction and thereafter returned to a fluid charging position, control means for initiating a molding cycle for injecting wax into said mold, a servo-control operably connected with said control means and responsive thereto to sense and control the movement of the movable ram and the pressure of said fluid molding material as generated by said movable ram forcing said material into said mold, said servo-control comprising means for actuating the movable ram and for effecting the movement thereof in a direction to initiate the injection of the fluid molding material into said mold, means operatively connected to said movable ram and to provide a first signal representative of the movement of the movable ram, means for providing a reference control signal that is representative of the movement desired for said ram in said molding cycle, means for comparing the first signal with the reference control signal and to provide a differential signal, and means for applying said differential signal to said ram actuating means effective corresponding to said differential signal to modify the movement of said ram and correspondingly regulate the injection of the fluid molding material into said mold, and means in said servo-control for limiting the quantum of the reference control signal comprising circuit means for providing a preselected maximum acceleration reference signal and a preselected maximum velocity reference signal which are representative respectively of the acceleration and velocity desired for said ram, and said servo-control having means for combining said acceleration and velocity reference signals to provide the reference control signal.

2. In an investment pattern molding machine as defined in claim 1 and wherein switch means interconnect the control means and the servo-control and are representative to said control means to selectively cause the reversible operation of the ram actuating means.

3. In an investment pattern molding machine as defined in claim 1 and wherein the servo-control comprises integrator circuit means operable to provide a reference control signal of variable rate of change of magnitude operable to cause the actuation of the ram at a preselected velocity and acceleration during the injection of the fluid material.

4. In an investment pattern molding machine as defined in claim 1 and wherein the control means is programmable to provide a plurality of control signals in predetermined sequence and thereby enable an automatic molding cycle to be performed.

5. In an investment pattern molding machine as defined in claim 4 and wherein the control means includes adjustable timer means programmable to provide a molding cycle having a preselected time period.

6. In an investment pattern molding machine as defined in claim 1 and wherein the control means includes means to enable said ram actuating means and to thereby cause the movement of the ram in the fluid injection direction during the molding cycle.

7. In an investment pattern molding machine as defined in claim 6 and wherein the means for enabling movement of the ram actuating means is programmed to cause movement of the ram in the fluid injection direction in a predetermined sequence during the automatic molding cycle.

8. In an investment pattern molding machine as defined in claim 7 and wherein the control means is programmed to enable movement of the ram during the automatic molding cycle in the fluid injection direction at a time subsequent to the movement of the nozzle into engagement with the mold.

9. In an investment pattern molding machine as defined in claim 1 and wherein the control means includes means to enable said ram actuating means such as to cause the reverse movement of the ram to the fluid charging position.

10. In an investment pattern molding machine as defined in claim 9 and wherein the means for enabling movement of the ram actuating means is programmed to cause movement of the ram to the fluid charging position in a predetermined sequence during the automatic molding cycle.

11. In an investment pattern molding machine as defined in claim 10 and wherein the control means is programmed to enable movement of the ram to the fluid charging position during the automatic molding cycle at a time subsequent to the movement of said ram in the fluid injection direction.

12. In an investment pattern molding machine as defined in claim 1 and wherein the machine includes a fluid injection nozzle movable into and out of engagement with said mold, said nozzle being connectable with the source of fluid molding material, and said ram being operable in moving in the fluid injection direction to force the fluid molding material through said nozzle and into the mold, and the control means includes means to initiate the movement of the nozzle into and out of engagement with said mold.

13. In an investment pattern molding machine as defined in claim 12 and wherein the means for initiating movement of the nozzle is programmed to cause the alternative movement of said nozzle into and out of engagement with the mold in predetermined sequence during the automatic molding cycle.

14. In an investment pattern molding machine as defined in claim 1 and wherein the machine includes platen means movable into and out of clamping engagement with the mold effective to retain said mold in said machine during the molding cycle, and said control means includes means to initiate the movement of said platen means.

15. In an investment pattern molding machine as defined in claim 14 and wherein the means for initiating movement of the platen means is programmed to cause the movement of said platen means in predetermined sequence during the automatic molding cycle.

16. In an investment pattern molding machine as defined in claim 15 and wherein the control means is programmed to initiate movement of the platen means during said molding cycle into clamping engagement with the mold prior to the initiation of movement of said nozzle.

17. In an investment pattern molding machine as defined in claim 1 and wherein the servo-control is a closed loop type control in which the means for actuating the ram provides an output signal from said control which causes the movement of the ram, the means operatively connected to the ram provides a first input signal to said control which is representative of the actual movement of said ram, and the means providing the reference signal which is representative of the desired movement of said ram providing a second input signal to said control.

18. In an investment pattern molding machine as defined in claim 17 and wherein the means operatively connected to the ram comprises a source of voltage connected to said servo-control and means to vary the magnitude of the voltage in corresponding relation to the movement of the ram in the fluid injection direction.

19. In an investment pattern molding machine as defined in claim 18 and wherein the means operatively connected to the ram comprises a variable rheostat connected to a source of voltage and to the servo-control and said ram being connected to the movable arm of said rheostat whereby the first input signal to said control is a voltage signal whose magnitude varies corresponding to the movement of the ram in the fluid injection direction.

20. In an investment pattern molding machine as defined in claim 19 and wherein the servo-control includes differentiator means to which is applied the first input signal to said control, a comparator connected to said differentiator means, and wherein the means for providing the reference signal representative of the movement desired for said ram is connected to said comparator to provide the differential signal between said first input signal and said reference signal and said servo-control having circuit means connecting said comparator to the ram actuating means whereby said differential signal is effective to correspondingly modify the movement of said ram.

21. In an investment pattern molding machine as defined in claim 20 and wherein the ram actuating means comprises a source of hydraulic fluid, valve means and hydraulic conduit means connected between said source and the ram actuating means, and said differential signal being applied to said ram actuating means to cause the actuation of said valve means effective to cause the ram to move in the fluid injection direction.

22. In an investment pattern molding machine as defined in claim 21 and wherein the ram actuating means comprises coil means energizeable by said differential signal and effective to operate the valve means.

23. In an investment pattern molding machine as defined in claim 1 and wherein the servo-control comprises signal means that provide a pressure signal representative of the maximum pressure desired for the fluid molding material during the molding cycle.

24. In an investment pattern molding machine as defined in claim 23 and wherein the signal means providing the pressure signal is in circuit with the limiting means and effective to provide a maximum quantum level for the reference control signal.

25. In an investment pattern molding machine as defined in claim 23 and wherein the servo-control comprises transducer means responsive to the fluid pressure of the molding material and effective to provide a signal representative of said fluid pressure, and circuit means connecting the transducer means to the ram actuating means whereby the signal that is representative of fluid pressure of the molding material is compared with the pressure signal that is representative of the desired maximum pressure.

26. In an investment pattern molding machine as defined in claim 25 and wherein the circuit means comprises means comparing the signal representing the actual fluid pressure of the molding material with the signal representative of the desired maximum pressure and operable to correspondingly limit the velocity of the movable ram so that the actual fluid pressure of the molding material does not exceed said desired maximum pressure.

* * * * *